United States Patent
Fontes et al.

(10) Patent No.: US 10,151,608 B2
(45) Date of Patent: Dec. 11, 2018

(54) SYSTEM AND METHOD FOR REDUCING NOISE IN A SENSOR SYSTEM

(71) Applicant: Microchip Technology Incorporated, Chandler, AZ (US)

(72) Inventors: Ruben Fontes, Donneloye (CH); Lionel Portmann, Lausanne (CH)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 222 days.

(21) Appl. No.: 14/978,803

(22) Filed: Dec. 22, 2015

(65) Prior Publication Data
US 2017/0176225 A1   Jun. 22, 2017

(51) Int. Cl.
G01D 18/00   (2006.01)
G01D 5/24    (2006.01)
G06F 3/041   (2006.01)
G06F 3/044   (2006.01)

(52) U.S. Cl.
CPC ............... *G01D 18/00* (2013.01); *G01D 5/24* (2013.01); *G06F 3/044* (2013.01); *G06F 3/0416* (2013.01)

(58) Field of Classification Search
CPC ......... G06F 3/0416; G06F 3/044; G01D 5/24; G01D 18/00
See application file for complete search history.

(56) References Cited

U.S. PATENT DOCUMENTS

| | | | |
|---|---|---|---|
| 4,922,061 A | 5/1990 | Meadows et al. | 347/175 |
| 6,025,726 A | 2/2000 | Gershenfeld et al. | 324/671 |
| 2010/0060589 A1 | 3/2010 | Wilson | 345/173 |
| 2011/0097215 A1 | 4/2011 | O'shaughnessy et al. | 417/48 |
| 2013/0176039 A1 | 7/2013 | Lamesch | 324/683 |
| 2013/0271410 A1 | 10/2013 | Krah et al. | 345/173 |
| 2014/0049266 A1 | 2/2014 | Heim et al. | 324/603 |

(Continued)

FOREIGN PATENT DOCUMENTS

| | | | | |
|---|---|---|---|---|
| DE | 202008007929 U1 | 9/2008 | | G06F 3/037 |
| EP | 0818751 A1 | 1/1998 | | G06F 3/033 |

(Continued)

OTHER PUBLICATIONS

Davison, Burke, "AN1478: mTouch™ Sensing Solution Acquisition Methods Capacitive Voltage Divider," Microchip Technology Incorporated, 28 pages, Oct 26, 2012.

(Continued)

*Primary Examiner* — Joseph C Nicely
(74) *Attorney, Agent, or Firm* — Slayden Grubert Beard PLLC

(57) ABSTRACT

A sensor system has an acquisition unit comprising an analog to digital converter generating a series of digital sensor signals, a first evaluation unit receiving the series of digital sensor signals for evaluation, wherein the first evaluation unit generates output signals that correspond to a sensor event, and a second evaluation unit independent from said first evaluation unit receiving the series of digital sensor signals. At least a first and second series of digital sensor signals is processed by the second evaluation unit to generate a control signal that is configured to select a sampling frequency controlling the analog-to-digital converter, wherein the first and second series of digital sensor signals are sampled at different sampling frequencies.

35 Claims, 19 Drawing Sheets

(56) References Cited

U.S. PATENT DOCUMENTS

| | | | | |
|---|---|---|---|---|
| 2014/0267157 A1 | 9/2014 | Dorfner | ......................... | 345/174 |
| 2015/0212623 A1 | 7/2015 | Hatano et al. | ................ | 345/174 |
| 2017/0329456 A1* | 11/2017 | Leigh | .................... | G06F 3/0418 |

FOREIGN PATENT DOCUMENTS

| | | | | |
|---|---|---|---|---|
| WO | 99/00166 A1 | 1/1999 | ............ | A41D 13/00 |
| WO | 2004/007045 A1 | 1/2004 | ............ | A41D 31/00 |
| WO | 2004/028670 A1 | 4/2004 | ............ | A47C 31/10 |
| WO | 2009/024779 A1 | 2/2009 | ............ | A41D 13/05 |
| WO | 2011/154468 A1 | 12/2011 | ........... | H03K 17/955 |

OTHER PUBLICATIONS

International Search Report and Written Opinion, Application No. PCT/US2016/067909, 12 pages, dated Apr. 3, 2017.
International Search Report, Application No. PCT/EP2012/067099, 7 pages, dated Mar. 4, 2013.
International Search Report and Written Opinion, Application No. PCT/EP2013/067099, 13 pages, dated Apr. 8, 2014.
Microchip Technology Incorporated, "Microchip Announces Projected-Capacitive Touch Screen Controller With Noise-Robust, Advanced Multi-Touch and Gesture Performance," Press Release, 2 pages, Jun. 29, 2015.

* cited by examiner

| FIG. 4A | FIG. 4B |

| FIG. 7A |
| FIG. 7B |

SYSTEM AND METHOD FOR REDUCING NOISE IN A SENSOR SYSTEM

TECHNICAL FIELD

The present disclosure relates to methods and systems for operating sensors that are influenced by noise, in particular capacitive sensor systems.

BACKGROUND

Many sensor systems use detectors that are subject to noise which provides problems when evaluating the respective signal provided by the system. Such sensor systems are often used in noisy environment. Microcontrollers include peripheral devices that allow the detection and decoding of such sensors. Separate controllers for decoding and detecting activation of such sensor systems are also available.

In many conventional input systems, capacitive sensors are used as touch and proximity sensors. Various measurement methods are used in such systems such as capacitive voltage divider, relaxation oscillators, charge time measurement units or any other suitable capacitance measurement systems.

Capacitive sensor systems may also be used to detect non-touching gestures performed in a detection field provided for example by a quasi static alternating electric field. Such a sensor system can be realized by generating the quasi static alternating electrical field with a transmitting electrode and measuring the disturbances of such a field caused by an object entering the field with a plurality of receiving electrodes. Also, a single electrode or a transmitting and one or more receiving electrodes may be used. A voltage received can be used to measure the capacitance between the sensor electrode and its electrical environment, i.e., it is influenced by electrically-grounded objects like a human finger or a hand. Further, from this voltage, for example, the distance of a finger can be deduced. This information can be used for human-machine interfaces.

Some capacitive systems and other systems are available that use a combination of touch and non-touch detection. The problem with such conventional systems operating according to any of the above-mentioned principle or other principles is that electrical noise sources, such as fluorescent lamps or switched mode power supplies can affect the measurement. Thus, accurately and reliably estimating a signal in a noisy environment can become problematic.

FIG. 1 shows an example of a capacitive voltage divider (CVD) front end system (200) as used, for example, in semiconductor devices manufactured by the Assignee of the present application, with a sensing electrode (201) with an electrostatic coupling to a finger (202). The electrode (201) is connected to a circuit input ANx. ANx is connected by an analog multiplexer (203) to a sample and hold circuit (204), formed by the switch controlled by signal Ss and a sample capacitance storing Vadc. ANx represents one of possibly a plurality of sensors coupled with the analog multiplexer (204).

The normally high impedance ANx can also be driven to GND by a switch controlled by Sn. The analog multiplexer 203 also connects to AN0, which is driven to Vdd supply. The Signal AD1CHS controls the analog multiplexer 203. An analog to digital converter converts Vadc into a numeric value. A series of ADC numerical values (2) is summed by an accumulator & decimator (102) which yields then a data (3) used by higher level algorithm, like a button control or a finger positioning or tracking algorithm. It is assumed that the accumulator is cleared after each data, before a new series (1) of ADC values is acquired.

The finger electrical potential is susceptible to differ over time from the electronic reference level (ground), and therefore this effect is modeled by an AC voltage source Fn of instant amplitude Vnoise(t).

A noise detection system (110) as shown in FIG. 1 receives the data values (3), and with a filter (111) designed to reject near DC values and with power estimator (112), the system computes the amount of variation seen of the data stream, yielding a noise level (113).

This noise level is fed into an algorithm (114) which adapts the sampling rate Fs of the CVD system (200). Also it is not illustrated, this algorithm can for example change the sampling rate if the noise level exceeds a certain threshold.

FIG. 2 illustrate a switching sequence of signals Sn, AD1CHS and Ss in the circuit shown in FIG. 1. These signals control the behavior of the CVD front end, forcing ANx input to be either driven to '0', for example the ground level, or being high impedance, an equivalent term for tristate. The signal AD1CHS controls the analog multiplexer, to connect either to AN0 or to ANx; the Ss signal controls the sample and hold state, either sampling state, an equivalent word for tracking, and holding state, during which the analog to digital conversion happens.

FIG. 3, bottom part, shows an example of 7 series of ADC numerical values measured at a certain sampling rate, each series contains 8 numerical values. The result of the decimated data shown on the time axis in the upper part of FIG. 3. When a noise level exceeds a certain threshold, the sampling rate is changed, in this example it is increased, and 4 additional series measurements are performed.

SUMMARY

According to an embodiment, a sensor system may comprise an acquisition unit comprising an analog to digital converter generating a series of digital sensor signals; a first evaluation unit receiving the series of digital sensor signals for evaluation, wherein the first evaluation unit generates output signals that correspond to a sensor event; and a second evaluation unit independent from said first evaluation unit receiving the series of digital sensor signals; wherein at least a first and second series of digital sensor signals is processed by the second evaluation unit to generate a control signal that is configured to select a sampling frequency controlling the analog-to-digital converter, wherein the first and second series of digital sensor signals are sampled at different sampling frequencies.

According to a further embodiment, the second evaluation unit may comprise a digital filter having an input receiving the series of digital sensor signals and an output providing a signal to generate the control signal. According to a further embodiment, the second evaluation unit may further provide for a power estimation of a signal processed by the second evaluation unit. According to a further embodiment, the sensor system may further comprise a first and second register configured to store a first and second score value generated by the power estimator unit and a comparator unit comparing the first and second score value to generate the control signal. According to a further embodiment, if the first score value is greater than or equal to the second score value the control signal is a first logic state and otherwise a second logic state. According to a further embodiment, the sensor system may further comprise a first multiplexer receiving a logic 0, a logic 1 and an output signal from the comparator unit; and a source control unit controlling the multiplexer, wherein an output of the first multiplexer controls a selection of the sampling frequency. According to a further embodiment, the output of the first multiplexer may control a second multiplexer configured to select either the first or second register. According to a further embodiment, the system may select between a plurality of sampling frequencies. According to a further embodiment, the system may select between a first and a second sampling frequency. According to a further embodiment, the first evaluation unit may combine pluralities of subsequent digital sensor signals into single output signals, and wherein the second evaluation unit is configured to evaluate a first packet of digital sensor signals and a second packet of digital sensor signals which immediately follows the first packet, wherein each packet comprises digital sensor signals sampled with a different sampling frequency. According to a further embodiment, the second evaluation unit can be configured to perform an evaluation periodically after a plurality of packets have been generated. According to a further embodiment, the sensor system may further comprise a switchable filter bank receiving the series of digital sensor signals and a subtraction unit receiving the series of digital sensor signals and being configured to subtract an output signal from the switchable filter bank from the series of digital sensor signals and forward a result to the digital filter. According to a further embodiment, the switchable filter bank may be controlled by a counter configured to count a number of sample values within a series of digital sensor signals. According to a further embodiment, the sensor system may further comprise a control unit within the acquisition unit configured to perform subsequent differential sensor signal measurements and a demodulator receiving output signals from the ADC. According to a further embodiment, the demodulator may multiply an output value of the ADC with either "+1" or "−1". According to a further embodiment, a filter characteristic of the digital filter can be selected depending on whether the second evaluation unit receives an output value from the ADC directly or an output from the demodulator. According to a further embodiment, the second evaluation unit may receive an output value from the demultiplexer and the digital filter is configured to a DC component. According to a further embodiment, the second evaluation unit may receive an output value directly from the ADC and the digital filter is configured to reject a modulation frequency of the differential sensor signal measurements. According to a further embodiment, the sensor system may comprise a plurality of sensors, wherein the acquisition system is configured to sequentially acquire at least one packet of sensor signals from each of the plurality of sensors, wherein each packet comprises a plurality of subsequent measurements from a sensor using a selected sampling frequency. According to a further embodiment, the second evaluation unit may be configured to select one of the plurality of sensors to provide said first and second packet of digital sensor signals. According to a further embodiment, a sensor of the plurality of sensors providing the strongest signal may be selected more often to provide said first and second packet of digital sensor signals. According to a further embodiment, a plurality of sampling frequencies can be provided and two preferred sampling frequencies are selected during a plurality of evaluations performed by the second evaluating unit.

According to another embodiment, a method for sampling sensor signals may comprise the steps of: generating a series of digital sensor signals with an analog to digital converter; generating output signals by a first evaluation unit receiving the series of digital sensor signals that correspond to a sensor event; receiving the series of digital sensor signals by a second evaluation unit independent from said first evaluation unit; processing at least a first and second series of digital sensor signals by the second evaluation unit to generate a control signal; and selecting by the control signal a sampling frequency controlling the analog-to-digital converter, wherein the first and second series of digital sensor signals are sampled at different sampling frequencies.

According to a further embodiment, the method may further comprise filtering the series of digital sensor signals and generating the control signal by the second evaluation unit. According to a further embodiment, the method may further comprise performing a power estimation of a signal processed by the second evaluation unit. According to a further embodiment, the method may further comprise storing a first and second score value generated by the power estimation and comparing the first and second score value to generate the control signal. According to a further embodiment, if the first score value is greater than or equal to the second score value the control signal can be a first logic state and otherwise a second logic state. According to a further embodiment, the method may further comprise selecting between a plurality of sampling frequencies. According to a further embodiment, the method may further comprise selecting between a first and a second sampling frequency. According to a further embodiment, the method may further comprise combining pluralities of subsequent digital sensor signals into single output signals, and evaluating a first packet of digital sensor signals and a second packet of digital sensor signals which immediately follows the first packet, wherein each packet comprises digital sensor signals sampled with a different sampling frequency. According to a further embodiment, the method may further comprise performing an evaluation periodically after a plurality of packets have been generated. According to a further embodiment, the method may further comprise subtracting an output signal from a switchable filter bank receiving the series of digital sensor signals from the series of digital sensor signals and forward a result for further filtering. According to a further embodiment, the method may further comprise controlling the switchable filter bank by a counter configured to count a number of sample values within a series of digital sensor signals. According to a further embodiment, a plurality of sensors is provided and wherein the method further comprises: sequentially acquiring at least one packet of sensor signals from each of the plurality of sensors, wherein each packet comprises a plurality of subsequent measurements from a sensor using a selected sampling frequency. According to a further embodiment, the method may further comprise selecting one of the plurality of sensors to provide said first and second packet of digital sensor signals. According to a further embodiment, a sensor from the plurality of sensors providing the strongest signal can be selected more often to provide said first and second packet of digital sensor signals. According to a further embodiment, a plurality of sampling frequencies can be provided and two preferred sampling frequencies can be selected during a plurality of evaluations performed by the second evaluating unit.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

The various embodiments disclosed can be used for capacitive sensors used in touch screens, touch pads or buttons, having receiving electrodes and possibly emitting electrodes. The various embodiments provide improved detection for touch detection systems as well as non-touching detection systems. Hence, the embodiments can be applied to most sensor systems, even outside the field of capacitive sensing. Noise immunity is, however, a prevalent concern in capacitive sensors. For example, the standardized test "IEC61000-4-6 Immunity to Conducted Disturbances" reveals a common issue: Acquisition of a weak signal from the receive electrode at a given frequency when a disturbing noise overlaps the signal with a slightly different frequency. Furthermore, the requirement for short scan time, desirable for responsive user interfaces, exacerbates this problem of distinguishing, during a short observation, signal and noise occupying nearby frequencies.

Figure 3:
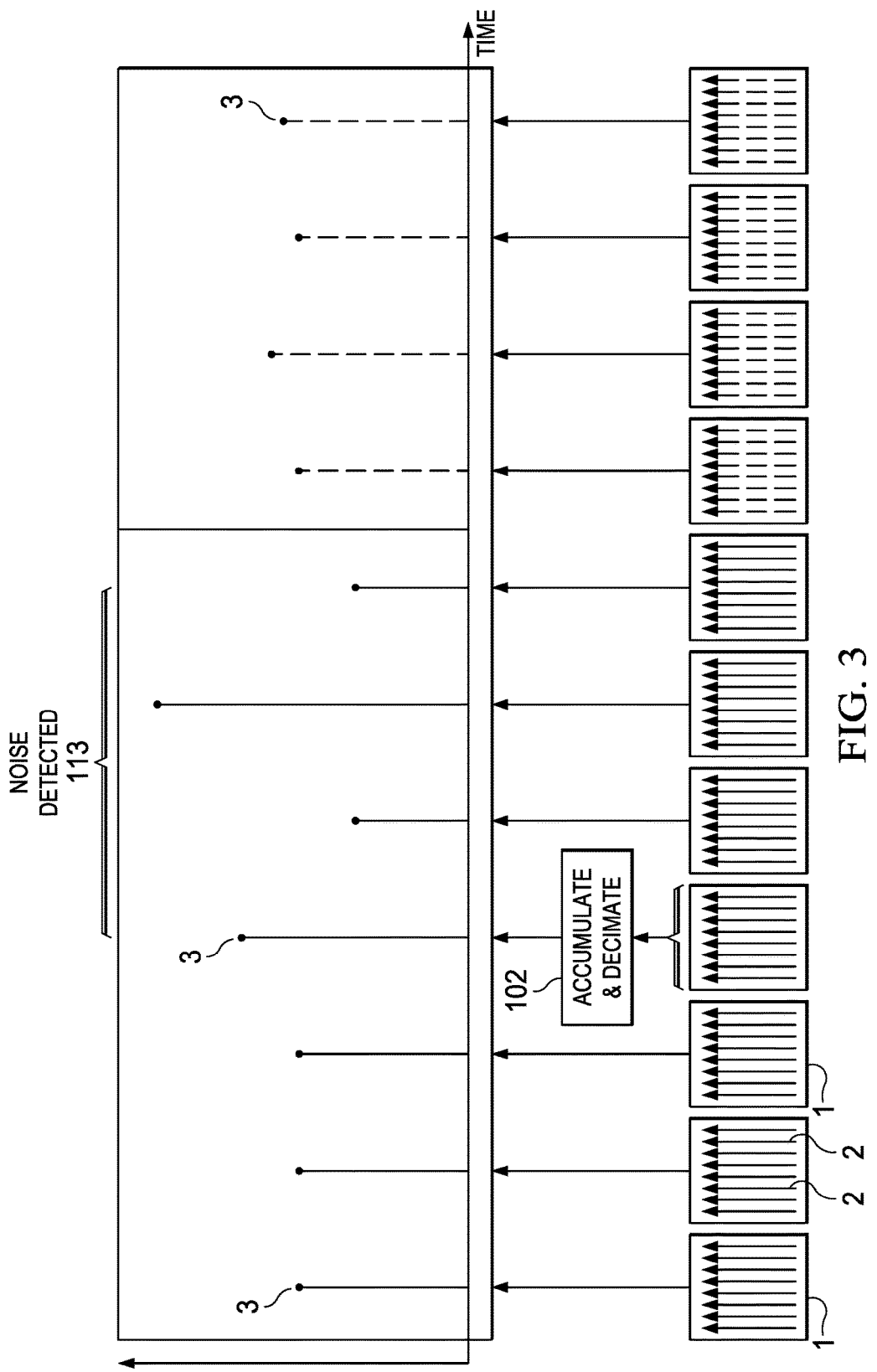
FIG. 3 illustrates signal acquisition and processing of the system shown in FIG. 1 in a timing diagram.
Figure 6:
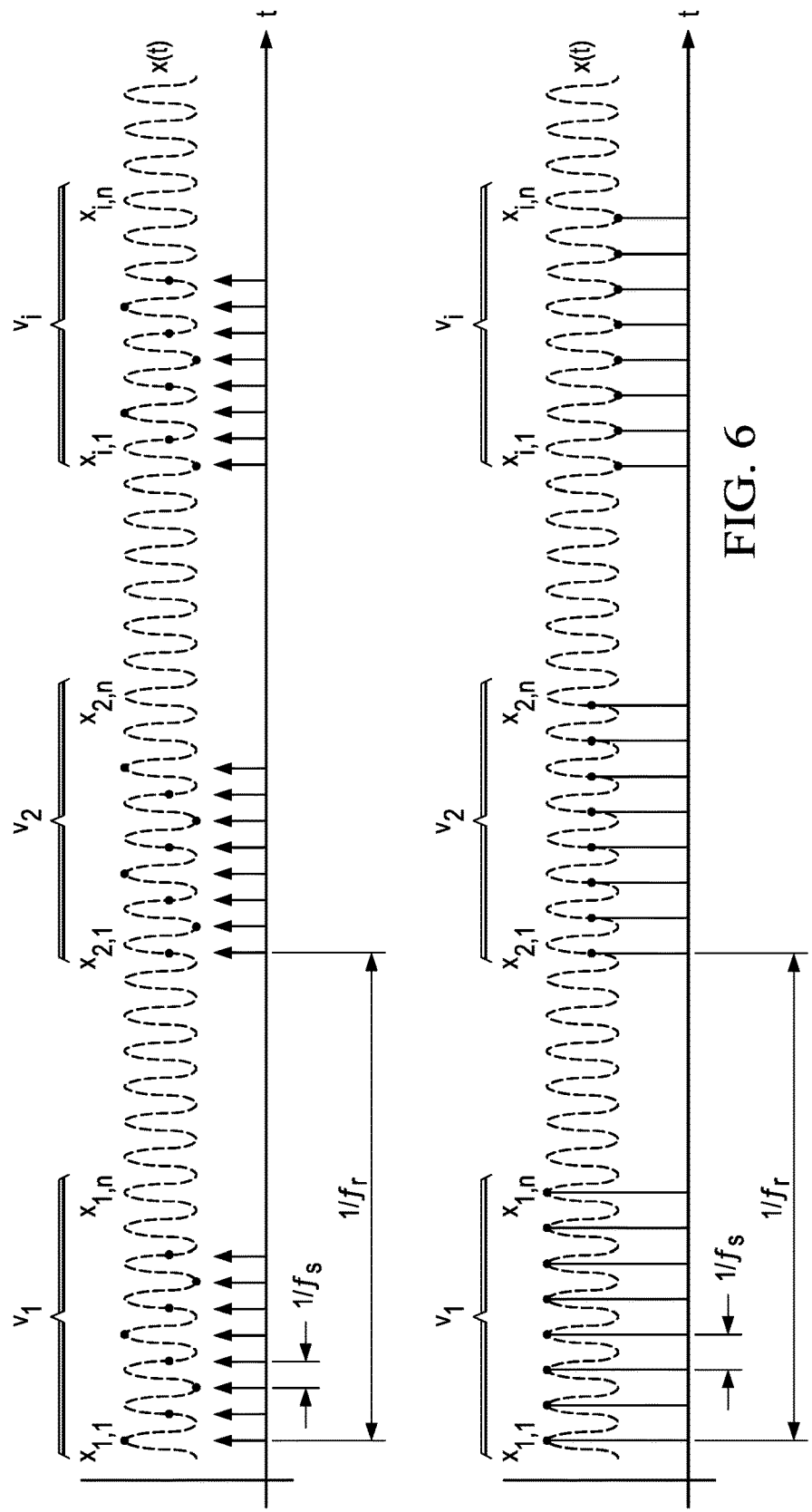
FIG. 6 is timing diagram shown signal sampling sequences.
Figure 6A:
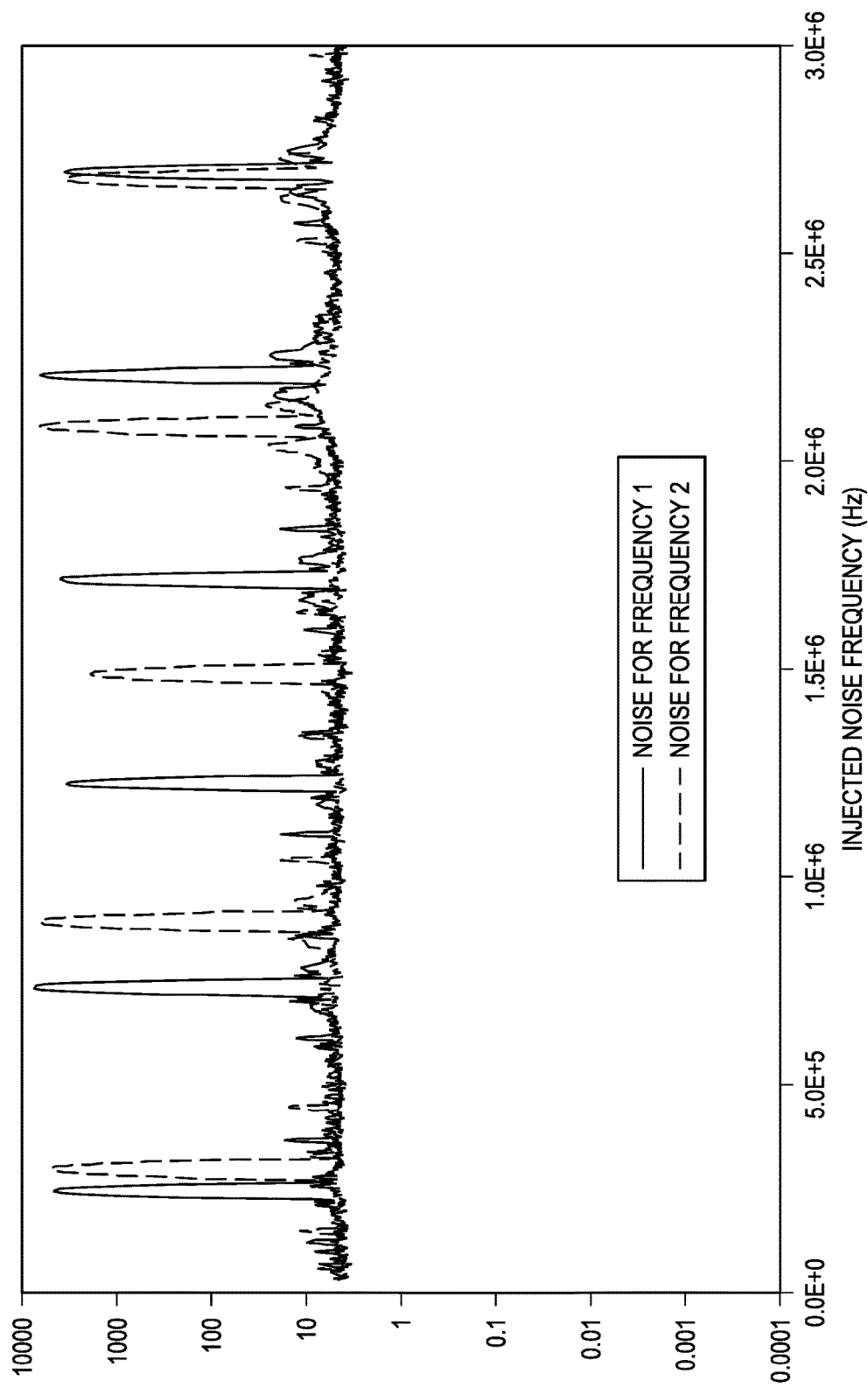
FIG. 6a shows noise acquired by two different sampling rates.

As shown in FIG. 3, it is a common technique to acquire several times data from a sensor in a series (1) of ADC values (2), and to compute a sum or an average (3) of this series before further processing by higher level algorithms, such as dealing with baseline, dealing with thresholds or finger location or tracking. A series is also called a packet in this disclosure. This process of acquiring in a burst a series of ADC samples is known also as oversampling. The summing or averaging operator (102) increases the resolution of the measurement and if the sampling rate, also called sampling frequency is adequate, it also reduces noise from interferences. It is a known that choosing an appropriate sampling rate helps greatly in separating noise and signal, as, for example, FIGS. 6 and 6a illustrate. The operation of only keeping the average or sum is an operation sometimes called decimation, and it reduces the complexity of data processing afterward.

FIG. 6 illustrates the same signal x(t) being sampled at different sampling frequencies, top and bottom graphs. Each series i contains n ADC values represented by the black dots, labeled $x_{i,1}$ to $x_{i,n}$, which after decimation produce the data labelled $v_i$.

The top graph illustrates a desired situation: The ADC samples x within a series appear to have spread values in the vertical axis, but the decimated values $v_1$ to $v_i$ show a remarkable consistency. The bottom graph on the other hand shows an undesired situation, where ADC samples x within a series appear to be well grouped in the vertical axis, giving the false believe of a noise free signal, but where decimated values $v_1$ to $v_i$ are inconsistent over time.

Figure 6B:
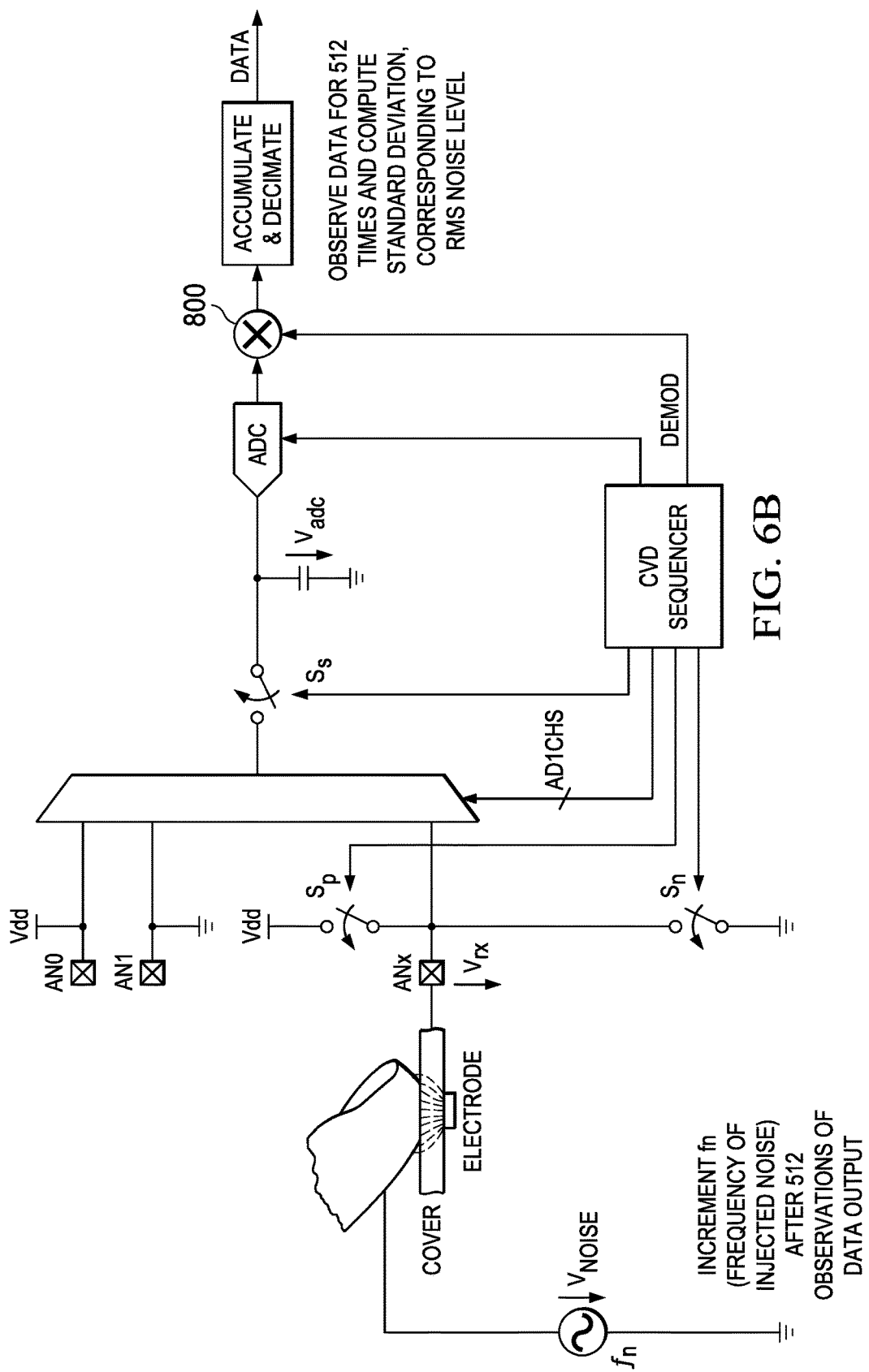
FIG. 6b shows a test setup for generating experimental data.

FIG. 6a illustrates experimental result collected with the setup shown in FIG. 6b. A waveform generator generating a sinus wave, considered as noise for the acquisition system, of constant amplitude (Vnoise) with a controlled frequency fn is connected to a mechanical finger coupling to an electrode. A differential CVD acquisition system is used to collect ADC samples in series, and to compute decimated datas.

For each noise frequency, 512 repetitive data are measured and their standard deviation is computed. Noise frequency is then incremented, and the process is repeated. The ADC sampling frequency is not altered during the experiment.

The FIG. 6a shows the result collected for 2 different sampling frequencies, vertical axis being the standard deviation, horizontal axis being frequency of injected noise. It illustrates that altering the sampling frequency can improve the resulting noise on the decimated data by a factor approaching 1000 (60 dB).

The various embodiments disclosed propose a strategy to quickly optimize the sampling rate, and provide for an improvement over conventional solutions:

A first conventional example is shown in FIG. 3. The figure shows one commonly used strategy to adapt sampling rate, where one waits for noise (113) to be visible in the decimated data (3) before trying to switch for another sampling rate. There are 3 drawbacks to this technique: first, legit finger motion can be confused for noise, and trigger an otherwise unnecessary frequency hop. Second, it may take several noisy data (3) to detect noise, and these noisy data cannot be recovered; either noise goes through, or no data at all is available; this is illustrated in FIG. 3. Third, even if this strategy allows to detect a sampling rate is not appropriate, it does not help find a better one; the system is left trying another sampling rate without guaranty of improvement.

According to another conventional example, a system may systematically acquires 3 series, yielding 3 data after decimation; each series can be acquired with a different sampling rates. The valid data is elected by a median filter. There are 2 drawbacks. Measurement is 3 times longer, and it requires at least 2 clean sampling rates to recover one bad sampling rate. According to a variant, the sampling rates are interleaved; this solves the critic of slow acquisition time, but introduce another artifact, where the same data is used multiple times.

The various embodiments provide for a method to rapidly compare the quality of different sampling rates, without the drawbacks of the previously described strategies.

Figure 1:
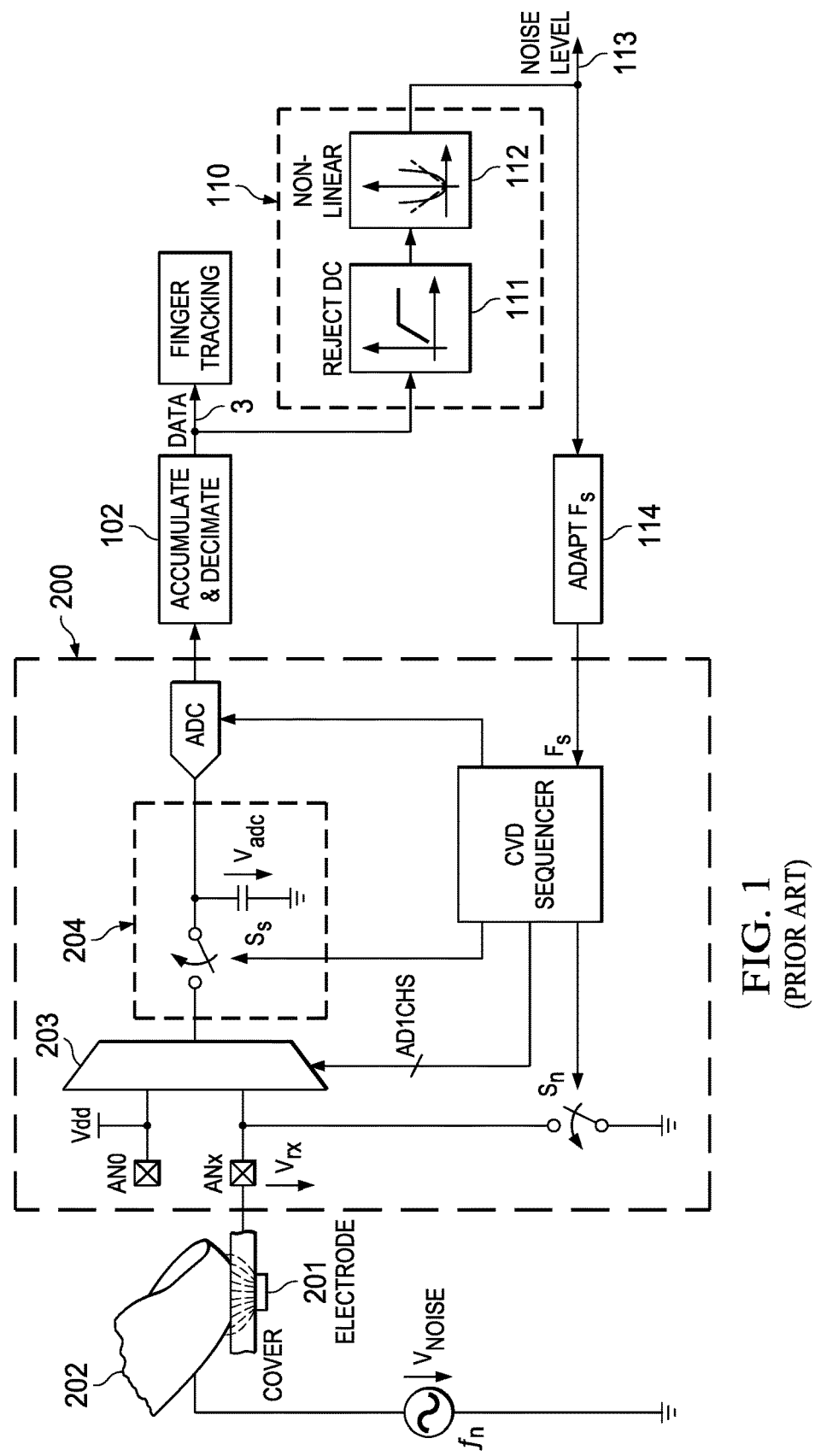
FIG. 1 depicts a conventional capacitive detection system using with robustness to noise.
Figure 2:
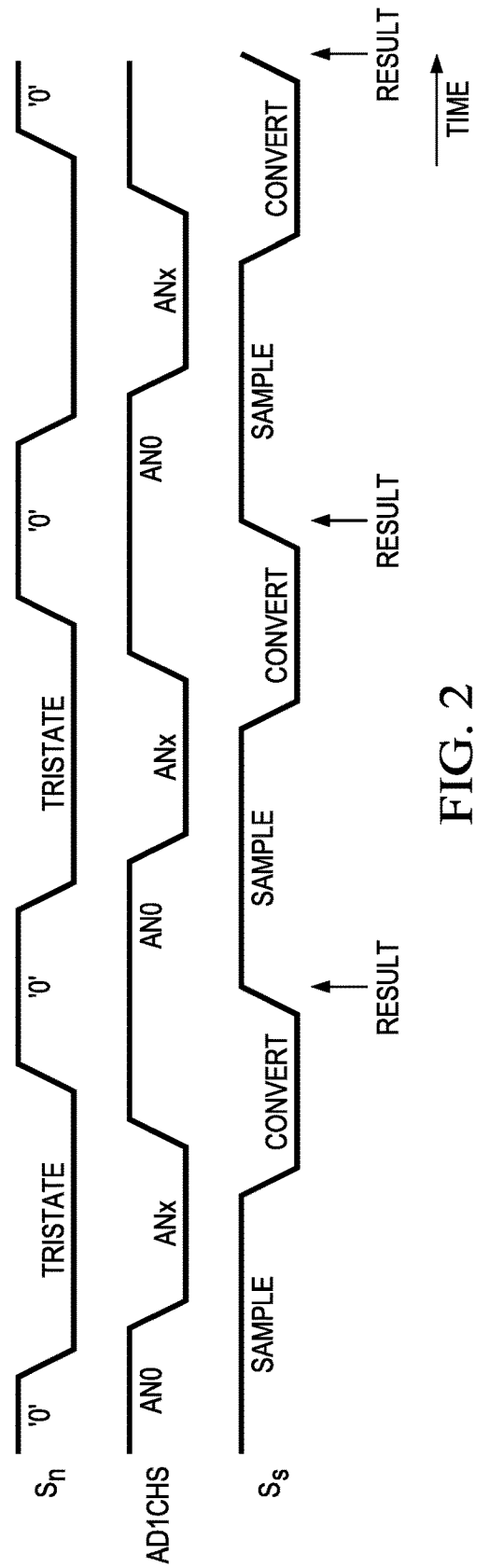
FIG. 2 depicts a timing diagram of control signals used in the system of FIG. 1.
Figure 4:
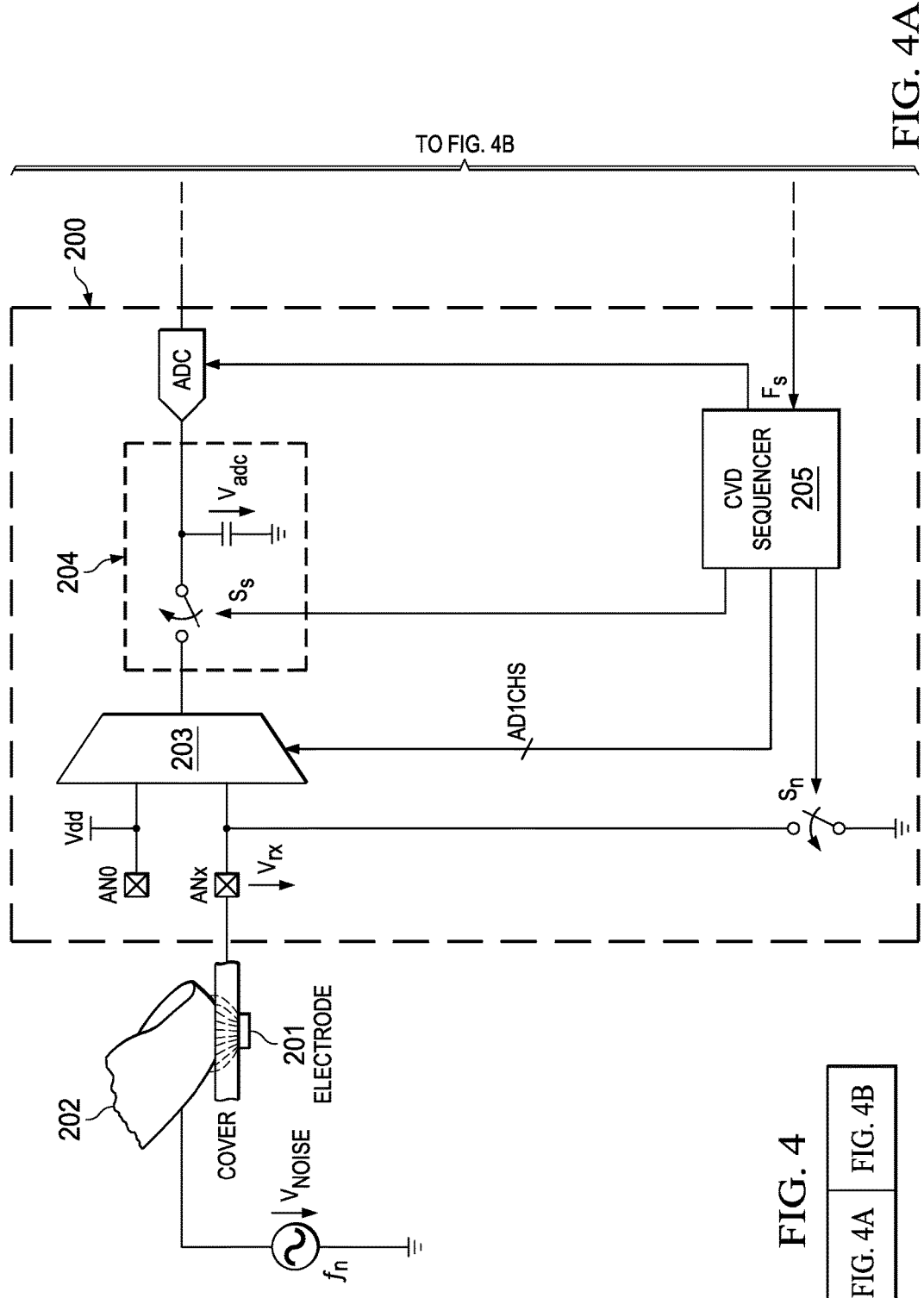
FIG. 4 depicts a first embodiment of an exemplary capacitive sensor system with noise robustness.
Figure 4B:
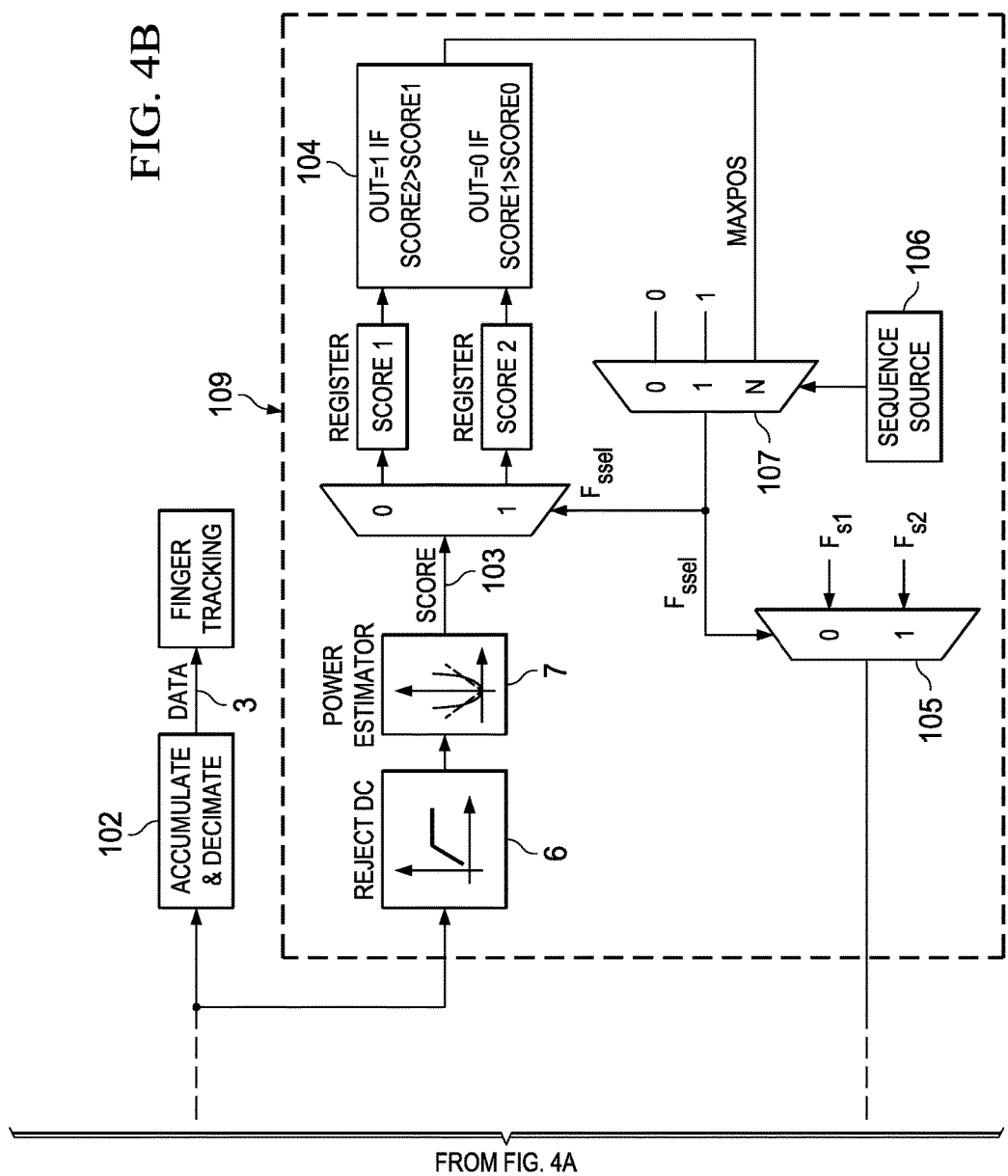

FIG. 4 illustrates one possible implementation using an evaluation system (9) that controls the acquisition system (200). The acquisition system (200) is again a capacitive voltage divider system in this example. However, other measurement systems may be used as discussed above. Hence, the acquisition system (200) generally provides for digital measurement values (2). Here, the CVD front end (200) is, for example, the same as before shown in FIG. 1 and comprises a controller unit (205) such as a state machine providing the control signals for the various switches and the ADC. Thus, the controller unit (205) is responsible for providing/generating the sampling frequency. A first evaluation unit is provided comprising the accumulator and decimator (1020 followed by the tracking system. The specification of this first evaluation system depends on the implementation and may vary. This first evaluation unit however is responsible for providing the actual output signals that indicate a respective event such as a touch or a gesture detection for further use by higher level algorithm. This portion of the system can be identical to that of a conventional system as shown in FIG. 1.

According to various embodiments, a sensor system is proposed that comprises an acquisition unit with an analog to digital converter generating a series of digital sensor signals. A first evaluation unit receives the series of digital sensor signals for evaluation, wherein the first evaluation unit generates output signals that correspond to a sensor event and may be further processed by another unit. A second evaluation unit independent from said first evaluation unit is provided that also receives the series of digital sensor signals, wherein at least a first and second series of digital sensor signals is processed by the evaluation unit to generate a control signal that is configured to select a sampling frequency controlling the analog-to-digital converter. Each series of digital sensor signals can be considered as a packet of signals. The second evaluation unit processes these packets to determine an actual sampling frequency used by the acquisition system. This can be done periodically after a certain number of packets has been processed.

The first and second series of digital sensor signals are generally sampled at different sampling frequencies and preferably the second series (packet) follows directly the first series after the sampling frequency has been switched to allow for a comparison of the effect of the different sampling frequencies. For example, a power estimator can be used to determine a power of the first and second series/packets of signals. The higher power indicates the preferred sampling frequency.

According to some embodiments, as shown in FIG. 4, the ADC digital signals (numerical values) (2) are fed into a numerical filter (6) of the second evaluation system (9), which in this embodiment is designed to reject the DC component, and possibly other frequencies depending on its implementation.

As further shown in FIG. 4, the DC reject filter (6) output is applied to an estimator of the variation of signal, or power estimator (7). The output of the power estimator is used as a score value (103), which can be stored into registers score1 and score2.

Alternatively, according to other embodiments, in particular software embodiments, the filter and power estimator function can be combined into a single type of processing. For example, in a software implementation, the function Noise_Calculation as replicated below is evaluating the score for an array "MTOUCH_capturedSamples[adc][ ]" of ADC samples. Said array contains MTOUCH_SAMPLES+1 elements. This implementation is used indifferently for differential CVD (which needs a demodulation) or non differential CVD. Computing delta=MTOUCH_capturedSamples[adc][i−1]−MTOUCH_capturedSamples[adc][i+1] is a basic form of filter which rejects DC and which keeps some of the AC components, and that computing the absolute value of delta (the if statement reversing the sign if negative) and accumulating it with MTOUCH_noise[adc]+=delta can be seen as a power estimation.

Furthermore, for example, a multiplexer may be used, as shown in FIG. 4, to direct the result in either register. The register score1 memorizes the score when $F_{ssel}$ is 0, and the register score2 memorizes the score when $F_{ssel}$ is 1. The signal $F_{ssel}$ also controls with a multiplexer (105) which sampling rate $F_s$ is used for the CVD front end, either a frequency $F_{s1}$ or a frequency $F_{s2}$. A comparison device (104) is coupled with the two registers score1, score2 and configured to identify which of the scores score1 or score2 is higher and outputs a signal "maxpos" accordingly. Finally, a sequence source (106) can force $F_{ssel}$ to be 0, to be '1', or in a 3rd state 'N' to use either 0 or 1 based on the value of maxpos. During the sequence state N, the sampling rate frequency will correspond to the frequency which yielded the highest score recorded previously. An example of a sequence source is shown in the FIG. 5.

Figure 5A:
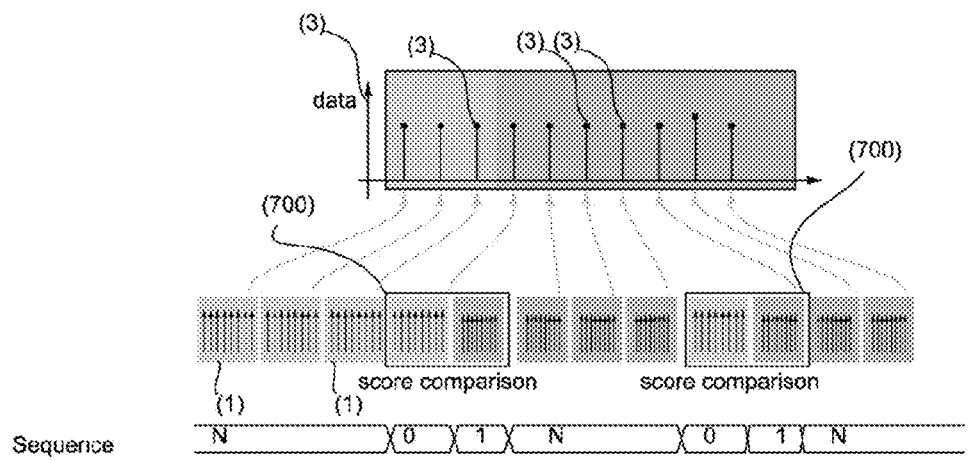
FIG. 5a illustrates signal acquisition and processing of the system shown in FIG. 4 in a timing diagram.
Figure 5B:
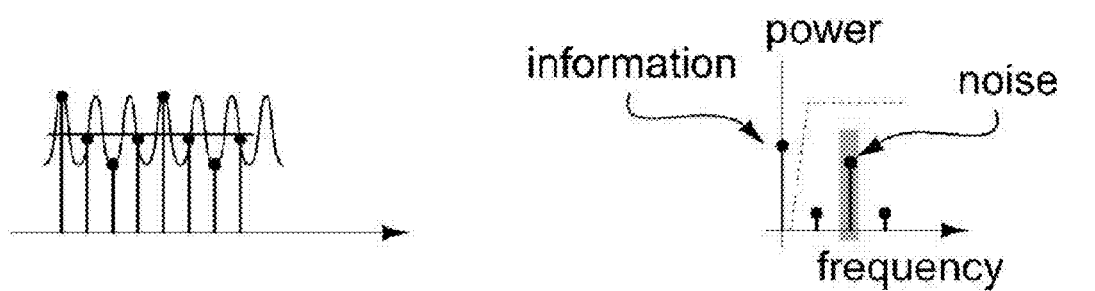
FIG. 5b illustrates timing diagram shown signal sampling sequences and associated frequency spectra.
Figure 5B:
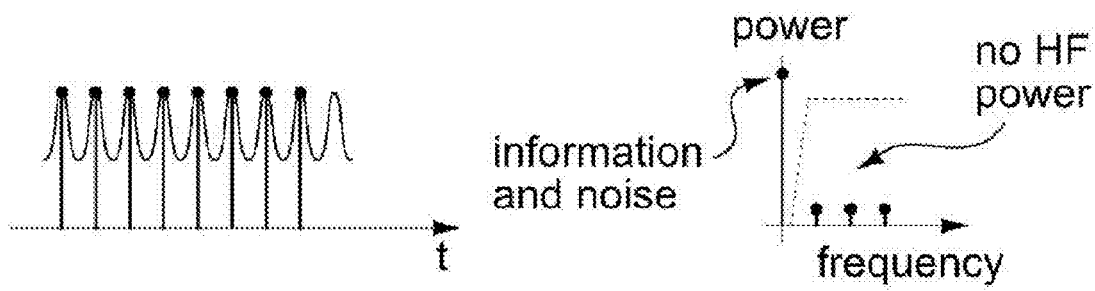

FIG. 5 is an exemplary illustration of the sequence applied for the system shown in FIG. 4. The sequence signal usually takes the state 'N' during which series of ADC values are acquired and decimated using the sampling frequency matching the highest recorded score. During scheduled score comparison, however the sequence state is set to 0 for one series of ADC values and quickly followed the state 1 for another series.

FIG. 5b is provided to explain the principle. The left side of FIG. 5b shows similar to FIG. 6 a time domain representation of ADC values from a single packet, when acquiring a signal x(t) containing a DC level, which is assumed to be the desired information, and a sinus wave which is assumed to be a disturbing noise. The right side in FIG. 5b shows the same data in frequency domain.

The top row shows the desired situation, when the sampling rate is chosen in a manner where the individual ADC samples appear to bear noise, since they vary, the bottom row shows the undesired situation where all ADC samples appear to have the sample value.

When looking at the spectral representation, it becomes apparent that the energy of the disturbing noise is either located away from DC (top row), therefore preserving the information located at DC; or as shown in the bottom row, the noise energy is located near DC and will be undistinguishable from the information.

According to the embodiment, as shown, for example, in FIGS. 4 and 5, at least two packets may be required, for example a first series (700) of ADC outputs (2), to be acquired each at a different sampling rate. Ideally, the two sampling series (700) may be acquired from the same electrode, and with a minimal delay separating the two sampling series as shown in FIG. 5. The goal is to ensure that the properties of the interference or noise does not change between the two sampling series, and that the mechanism which couples the interference source to the electrode is also not modified, for example because of the motion of the human finger which links the electrode and interferences. In practice, it is found that this requirement can be relaxed in many situations, the system will still function.

For each sampling series, the spectrum of the samples found inside the series is further analyzed in order to attribute a score value. One obtains therefore one score value for each series. This is done by a digital filter (6) combined with a form of power estimation (7). There are two core elements according to various embodiments. The first core element is to design a digital filter (6) which rejects the spectral portion normally retained by the sum and decimation operator (102), and which instead retains other spectral regions. The power of the retained filtered signal, or retained spectral region is used to compute a score (103) value; the higher the retained power, the higher the score. The second core element according to various embodiments is a mechanism (104) which compares the two scores, obtained with their respective sampling rates, and the mechanism favors the sampling rate which has the highest score.

It is a surprising discovery that operating the acquisition with a sampling rate which maximizes the noise or variation between the ADC samples yields after decimation more stable, less noisy results.

It is remarkable that the action of choosing a sampling rate by comparing two candidates can be done infrequently. How often the action needs to be done depends on the nature of the disturbing noise, and how quickly its spectrum content evolves over time, as discussed further below.

Several improvements can be made which can be added to the embodiment shown in FIG. 4. The embodiment shown in FIG. 7 adds to the embodiment of FIG. 4 a mechanism (400) to learn and store systematic errors from the ADC stream, and to subtract it from the ADC series before computing the score.

Figures 7, 7A:
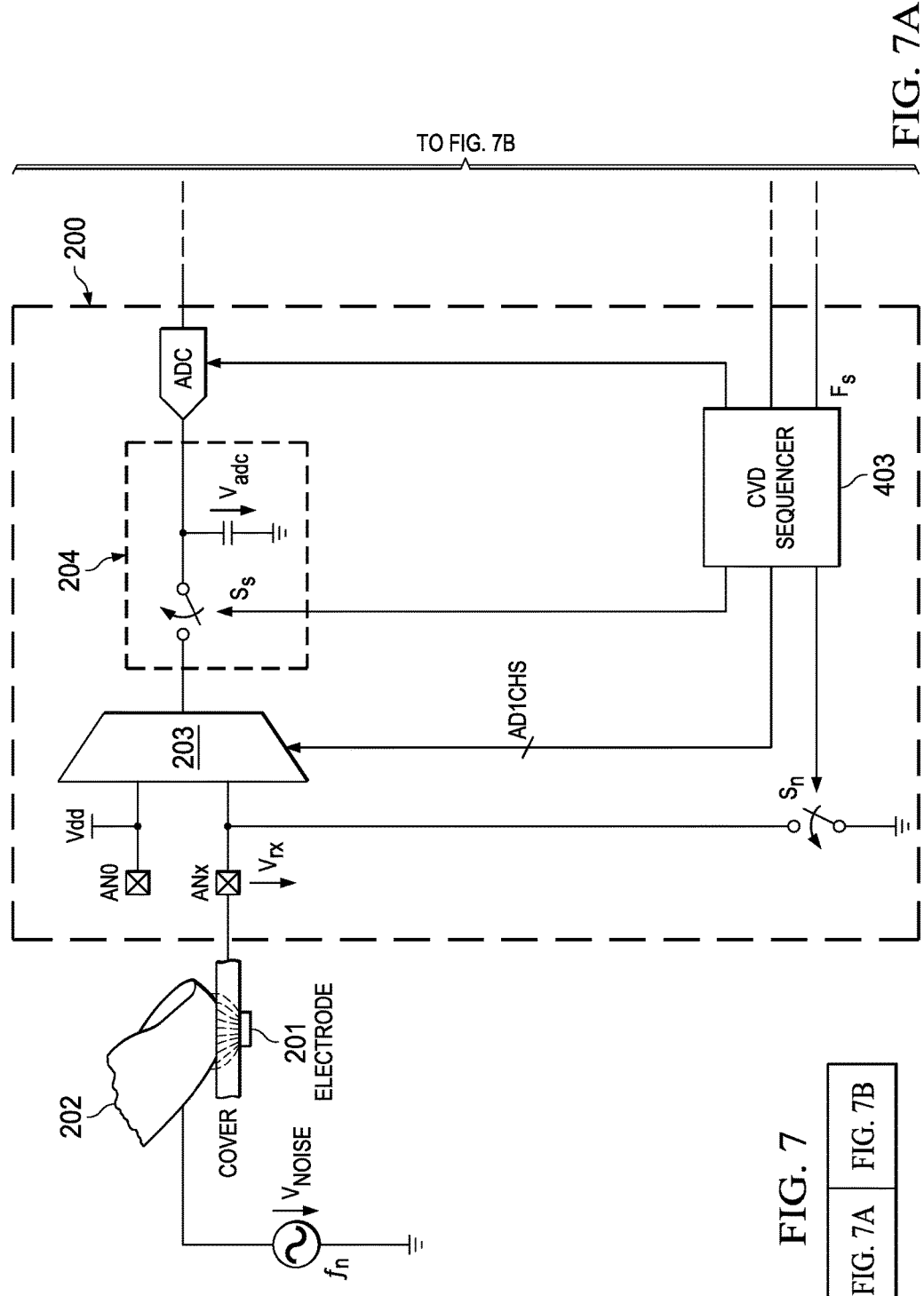
FIG. 7 depicts a second embodiment of an exemplary capacitive sensor system with noise robustness.
Figure 7B:
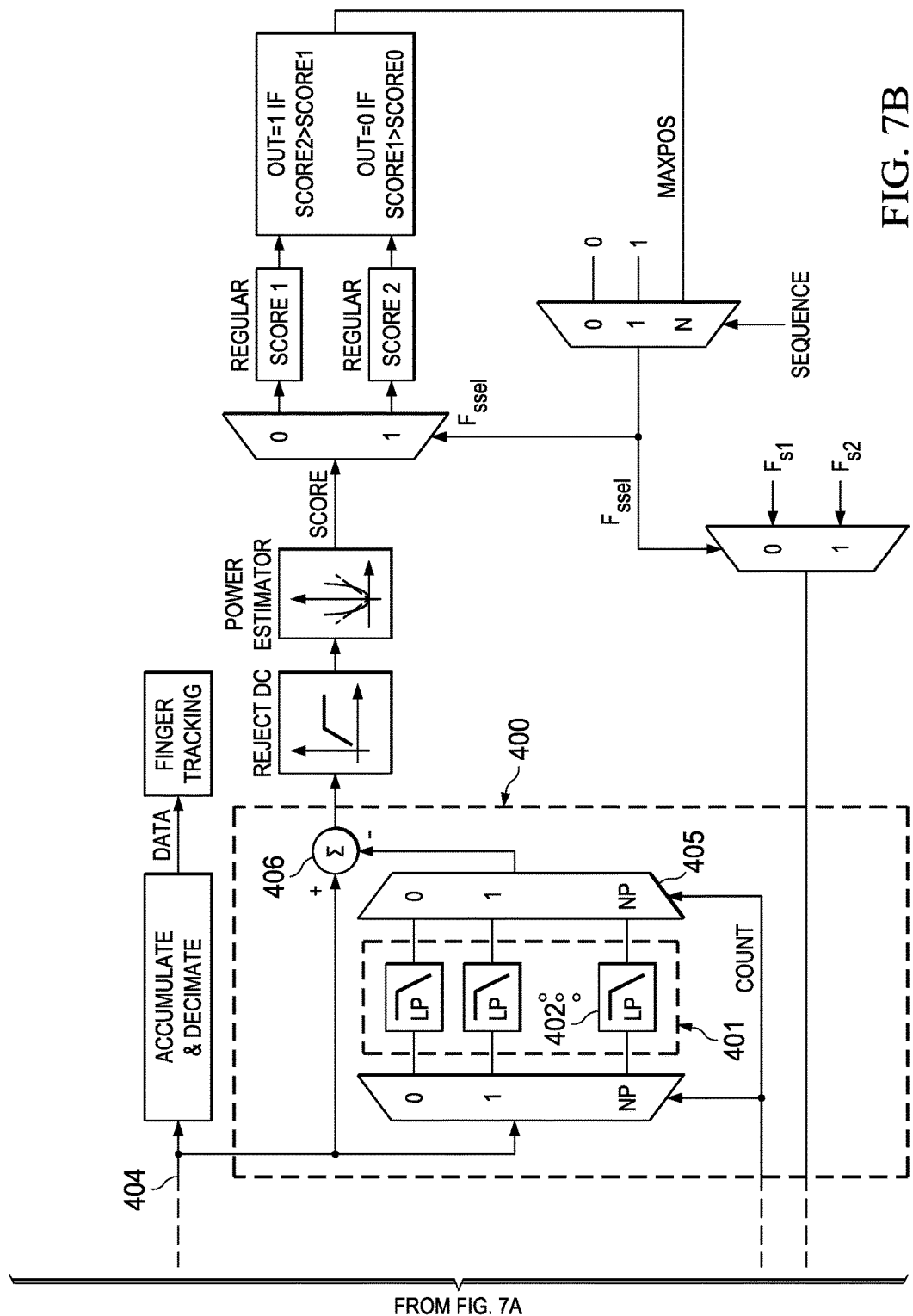

This mechanism (400) is made from a bank of low pass filters (402) comprising a plurality of selectable low pass filters (402), and a counter of ADC values providing a count signal (403). The counter can be a separate counter of may be a counter implemented in the acquisition module (200) as shown in FIG. 7. The counter is reset before every new series of ADC samples. The counter value (403) is used to feed the ADC sample to a low pass filter (402) which keeps the average value, and which removes the random variations. A multiplexer and a demultiplexer (405) can be used to select one of the filters (402). Both multiplexers are controlled by the corresponding stored value (403) of the counter to provide it for a subtraction using subtractor (406) which receives the output signal (404) from the ADC of the acquisition system (200). The remaining circuit parts correspond to those of the embodiment shown in FIG. 4.

This optional correction mechanism (400) may be needed before computing the score, for example when samples inside a packet are affected by systematic errors, like slow charge of an electrode, or systematic variation of sampling time. The idea is to correct systematic error which repeat every time a new packet is measured. Without any correction, such a systematic error would bias the score mark, because this error would be counted as noise and would increase the score mark. The improvement is to keep a correction value, stored for each sampling rate and sample position within a packet, and to apply the corresponding correction to the corresponding sample, respecting the sample position inside a packet and current sampling rate in use. The correction can be pre-computed and stored in advance, or can be automatically tracked by strong low pass filters who retain systematic deviations and filter out random noise. With this improvement, score marks can be compared with higher reliability. As stated above FIG. 7 shows a possible implementation.

Furthermore, optionally, a damping algorithm can be used to prevent the system from switching sampling rate excessively often. For example a low pass filter can be applied to the respective scores; or alternatively, the algorithm may require a sampling frequency to come multiple times with the highest score in order to be elected as the winning frequency. Damping is a good measure for example when the disturbing noise is not of constant amplitude; like IEC61000-4-6 test which specifies the noise is amplitude modulated.

Figure 8A:
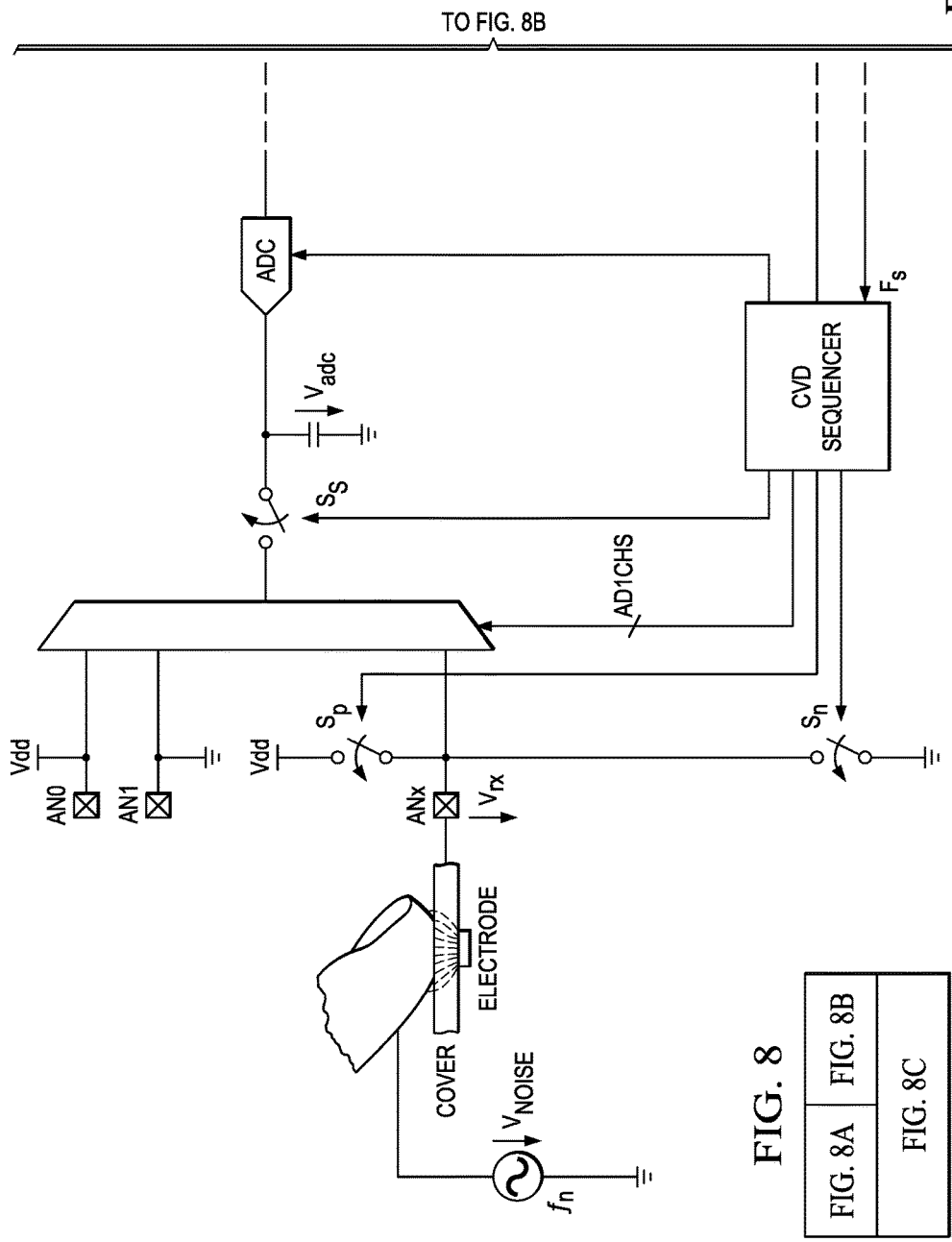
FIG. 8 depicts a third embodiment of an exemplary capacitive sensor system with noise robustness.
Figure 8B:
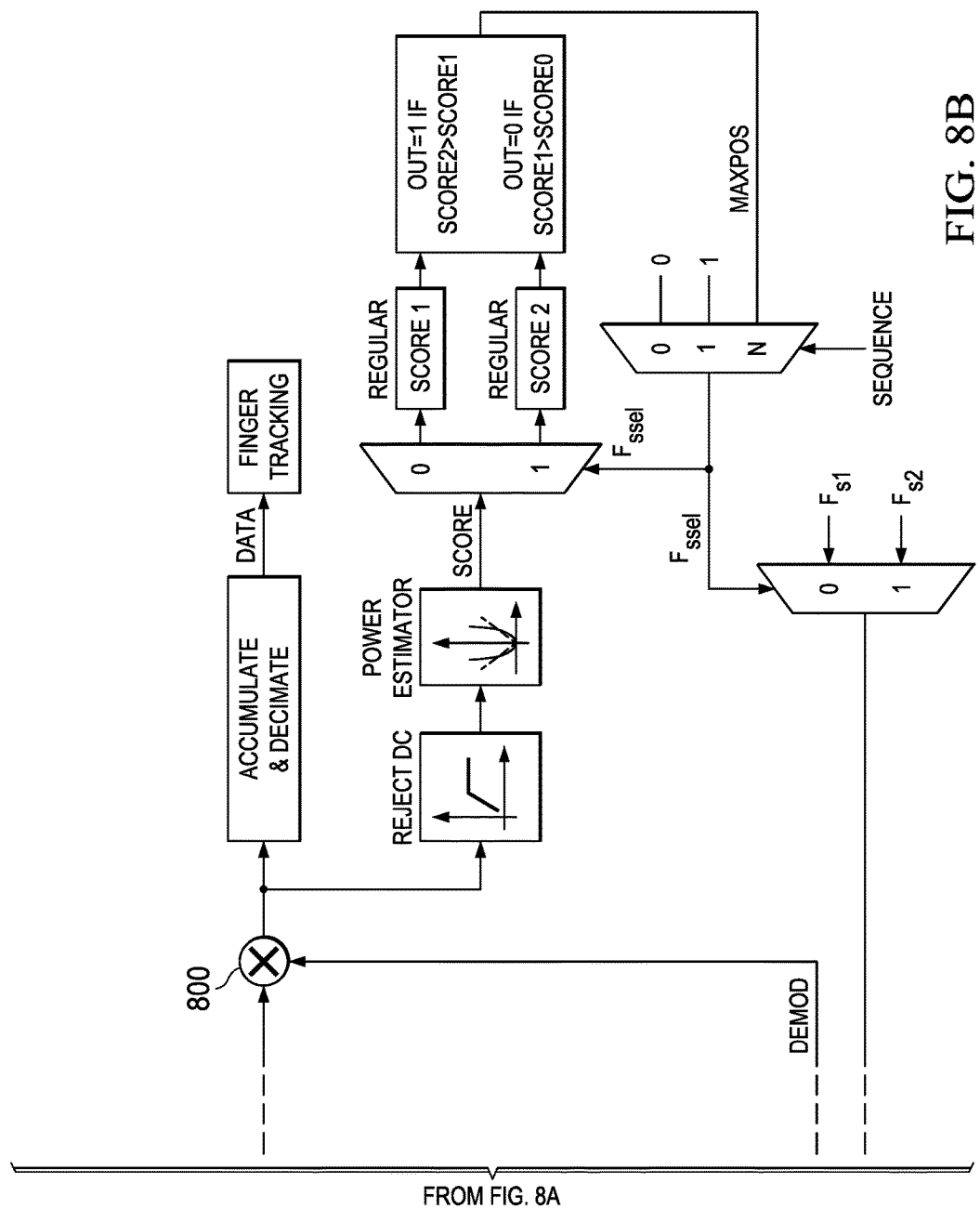
Figure 8C:
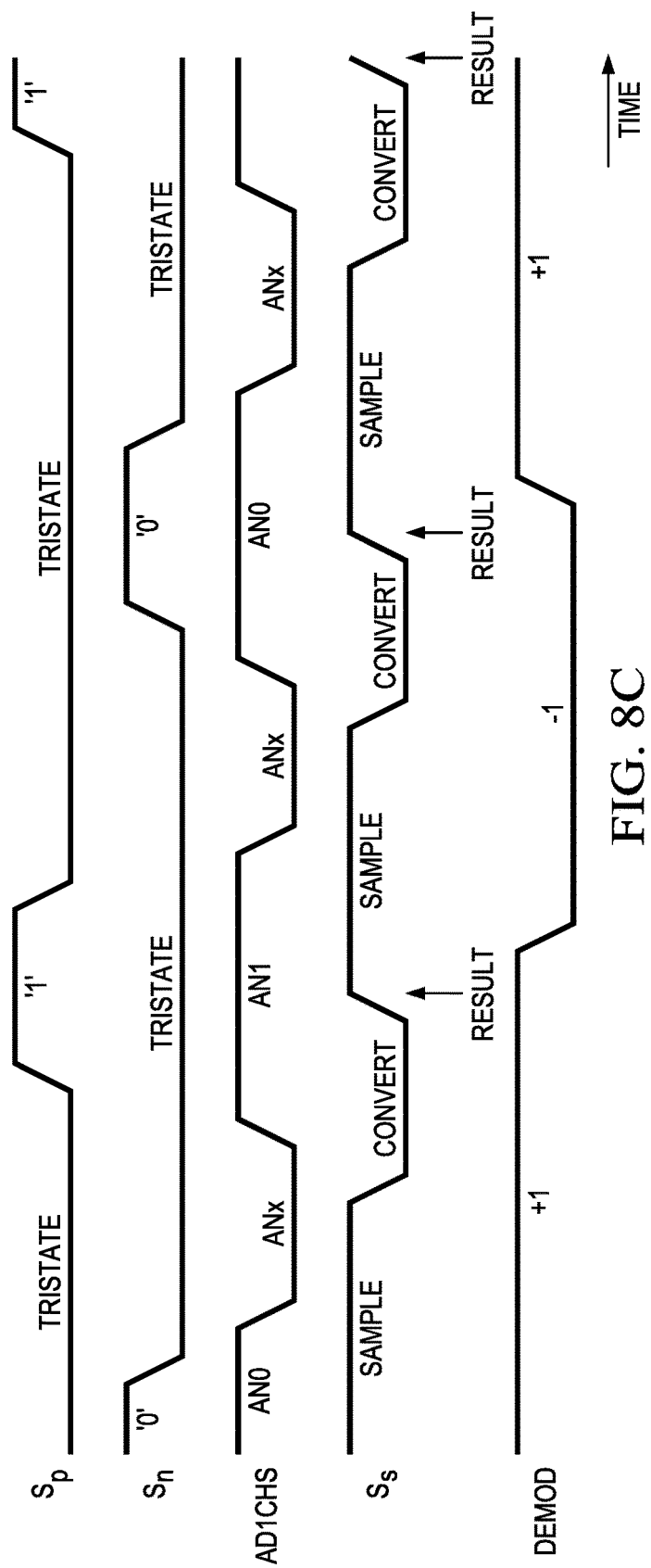

FIG. 8 illustrates the introduction of differential measurement, and a demodulation step (800). The CVD sequence alternates signal polarity, with an additional switch driven by $S_p$, to precharge the RX line to supply voltage Vdd, as well as a connection in the input analog multiplexer to precharge the sample and hold input capacitance to GND. Inputs AN0 and AN1 of the analog multiplexer may be connected to Vdd and Gnd to allow precharging of the sample and hold capacitor via switch Ss. Numerical output values from the ADC are also demodulated with a signal demod provided, for example, by the state machine controlling the acquisition sequence, here the CVD sequence controller. The timing diagram in FIG. 8 shows that the CVD charge distribution is sequentially performed with the sample and hold capacitor charged to Vdd and subsequently with the sample and hold capacitor discharged to Gnd. The demodulator either multiplies the result with "+1" or "−1" to compensate for this.

Figure 9:
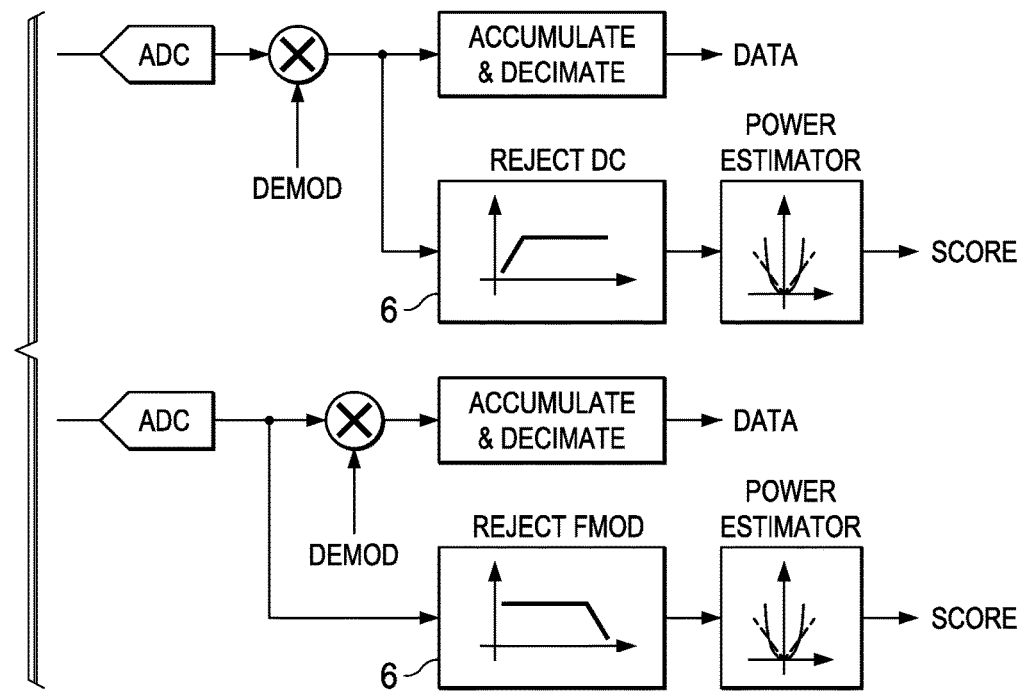
FIG. 9 two possible embodiments of the system according to FIG. 8.

As shown in the upper circuit of FIG. 9, according to one embodiment, the evaluation circuit (400) receives the output signal from the demodulator (800) which otherwise corresponds to a sequence of ADC values as provided by the circuit of FIG. 4. However, when such a modulation/demodulation system is used, the filter (6) used to compute a score can either be fed by a demodulated signal or can be fed by a still modulated signal as shown in the bottom circuit of FIG. 9 in which the input filter (6) may be designed to reject at least partially the spectral region near the modulation frequency.

Figure 10:
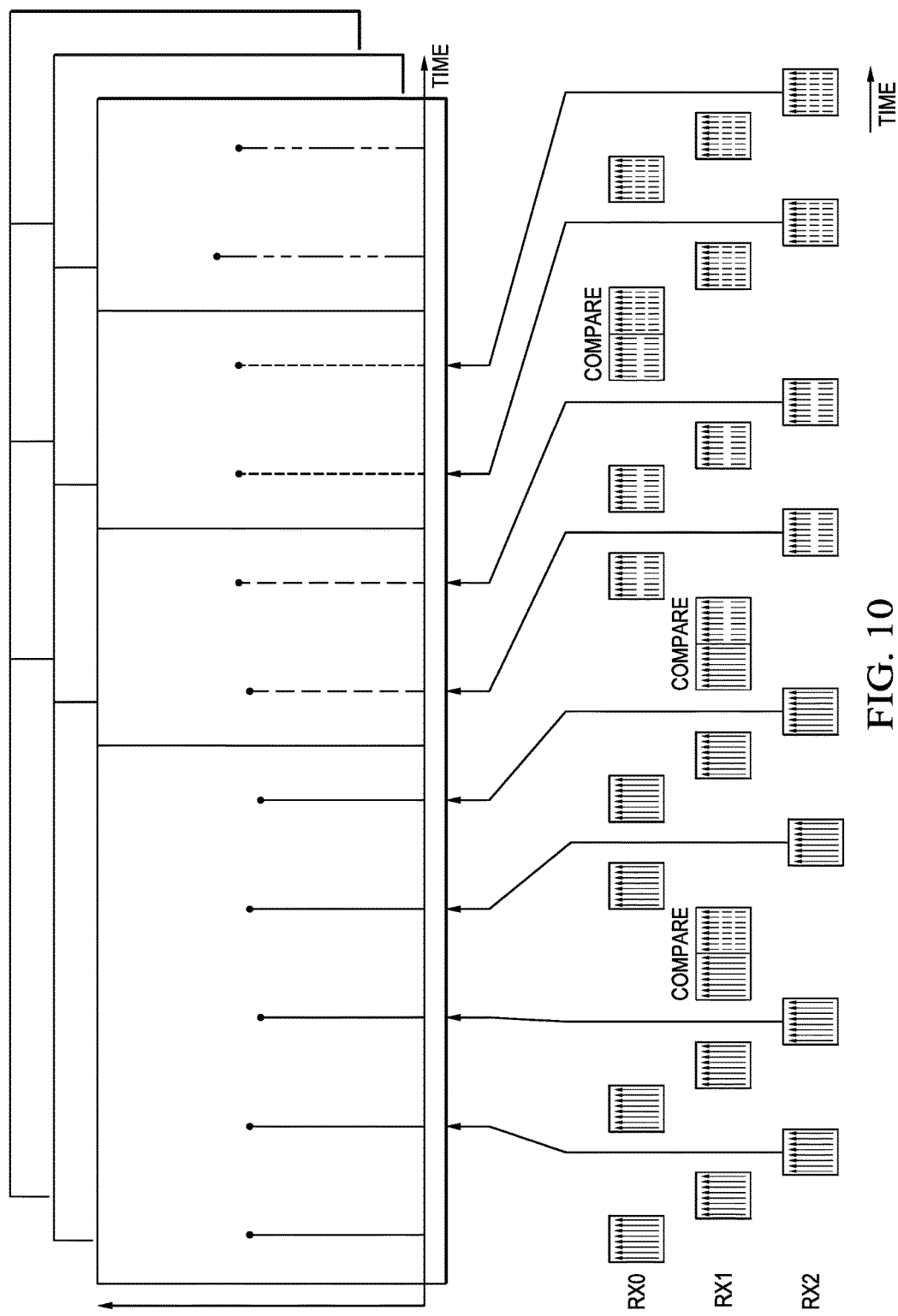
FIG. 10 shows signal acquisition and processing according to yet another embodiment.

Another optional improvement, as for example, shown in FIG. 10, applies when multiple electrodes are scanned by the system. In such a case, it is not necessary to compute scores for each electrode; instead, an algorithm is applied. The algorithm searches amongst the multiple electrodes which have recently been scanned, the one which exhibits the strongest signal, or alternatively, the one that exhibits the fasted change of signal. This means the algorithm searches for electrodes the most susceptible to noise by being located near a finger. Then, the scoring sequence can be only done for this electrode, and the resulting choice of sampling rate is applied for all other electrodes. It has been discovered that this algorithm yields more reliable decisions and also reduces the time spent testing various sampling rates.

According to FIG. 10, a scan sequence of several electrodes (RX0, RX1, RX2) is shown, and score comparison sequence at the location of the electrode with strongest signal (RX1 two first times, and then RX0). This figure also illustrates more than 3 sampling rates are tested, with a challenger/champion scheme. As shown in FIG. 10, the first six packets are provided by the acquisition unit wherein each sensor is sampled to provide two packets at a first sampling frequency. The, a first evaluation is performed by the second evaluation unit using the second sensor RX1. The two subsequent packets provided by sampling the second sensor RX1 are generated with the first and a second sampling frequency which as indicated in FIG. 10 is slower than the first sampling frequency. In this example, the second evaluation unit decides to keep the first sampling frequency. Then subsequent packets are provided by the first and third sensor RX0 and RX2 and full sequence of packets from the first, second and third sensor follows. Then a second evaluation is performed by the packets provided through the second sensor RX1 using the first and a third sampling frequency. Now the second evaluation unit switches the sampling frequency to the third sampling frequency and five more packets are provided until a third evaluation takes place. As shown in FIG. 10, the third evaluation is performed using the first sensor with the second and third sampling frequency. Depending on the individual packet results of the evaluation in the second evaluation unit, a selection of the sensor can be made as well as a selection of the used sampling frequencies.

Figure 11:
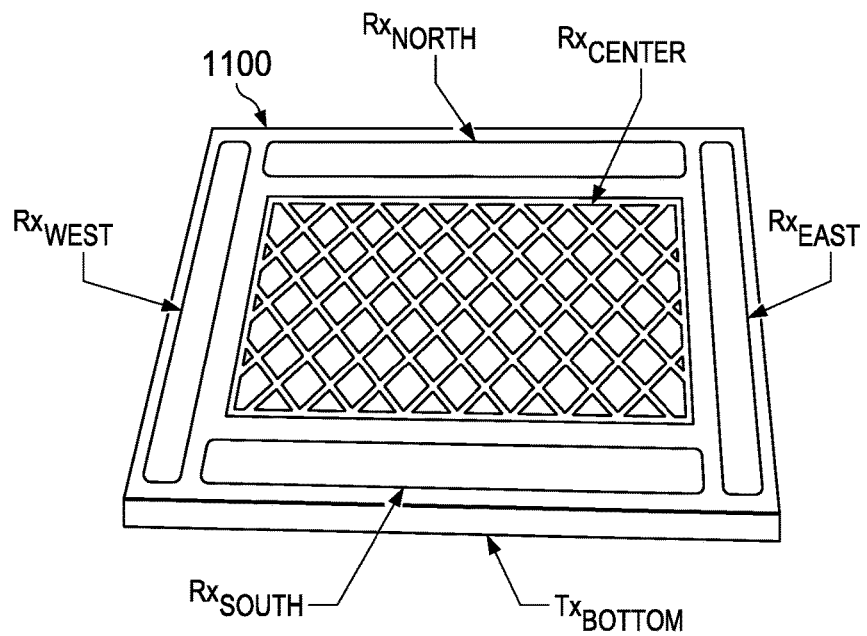
FIG. 11 shows sensor signals and noise acquired with two different sampling rates and associated score values.

The several electrodes (RX0, RX1, RX2) may be part of a plurality of touch sensors provided by an input panel or any other input system. However, as mentioned in the background section, the present embodiments are not restricted to any specific capacitive measurement system. For example, FIG. 11 shows a printed circuit board 1100 with a plurality of receiving electrodes $Rx_{West}$, $Rx_{East}$, $Rx_{North}$, $Rx_{South}$, and $Rx_{Center}$ arranged in a top layer and a transmitting electrode $TX_{bottom}$ arranged in a bottom layer or any other layer of a multi-layered printed circuit board. Such an electrode system can be used for non-touching gesture detection as described above and/or for a combined touch/non-touch detection system.

Another improvement according to other embodiments is to have more than two sampling rates tested; the principle of scoring and electing the sampling rate with the highest score can be generalized to 3, 4 or more predefined sampling rates, for example chosen for their non overlapping harmonics. When working with a number of predefined sampling rates, like 4 frequencies, it is not always needed to test all 4 sampling frequencies in a sequence; they can be tested in robin rounds. As a variant, the sampling rates can be tested two by two with a challenger (candidate frequency) vs champion (frequency recently preferred). More variants can be found, like in a play-off sport event with quarterfinals matches, semifinals and final, where the match is a score comparison.

Finally, one can use the scores of 2 or 3 sampling rates to perform gradient climb, where the sampling rate is adjusted with fine changes until the highest score is obtained. The sampling rate is adjusted toward the direction of the best scoring.

According to further embodiments, strategies can be used which help decide when it is appropriate to re-evaluate the scores. One strategy is to schedule a round of scoring tests as part of the scan sequence of multiple electrodes. For example, in a first step electrodes RX0, RX1, RX2 are measured and their respective data results are stored. In a second step, it will be identified which electrode has the stronger signal. In a third step, a scoring sequence for that electrode is performed, and the sampling rate is adjusted if needed. In a fourth step, the higher level functions are processed and then the method returns to the first step. According to yet another embodiment, another strategy may be used to scan multiple electrodes, such as electrodes RX0, RX1, RX2 in a sequence, and as soon as one electrode exhibits a rate of change greater than a threshold, a round of sampling rate score is started for this electrode, which perhaps leads to an adjustment of sampling rate.

The various embodiments also cover the case where the sensor uses a modulation/demodulation technique, as shown, for example, in FIG. 8. This technique is called differential CVD. The way of computing a score remains identical. The score is based on spectral components within a packet which are not kept by the accumulate and decimate path used to produce the data for finger tracking. For example FIG. 9 shows two different implementation, where the score is computed from the demodulated signal, or from the modulated signal, with a filter adapted accordingly.

Figure 12:
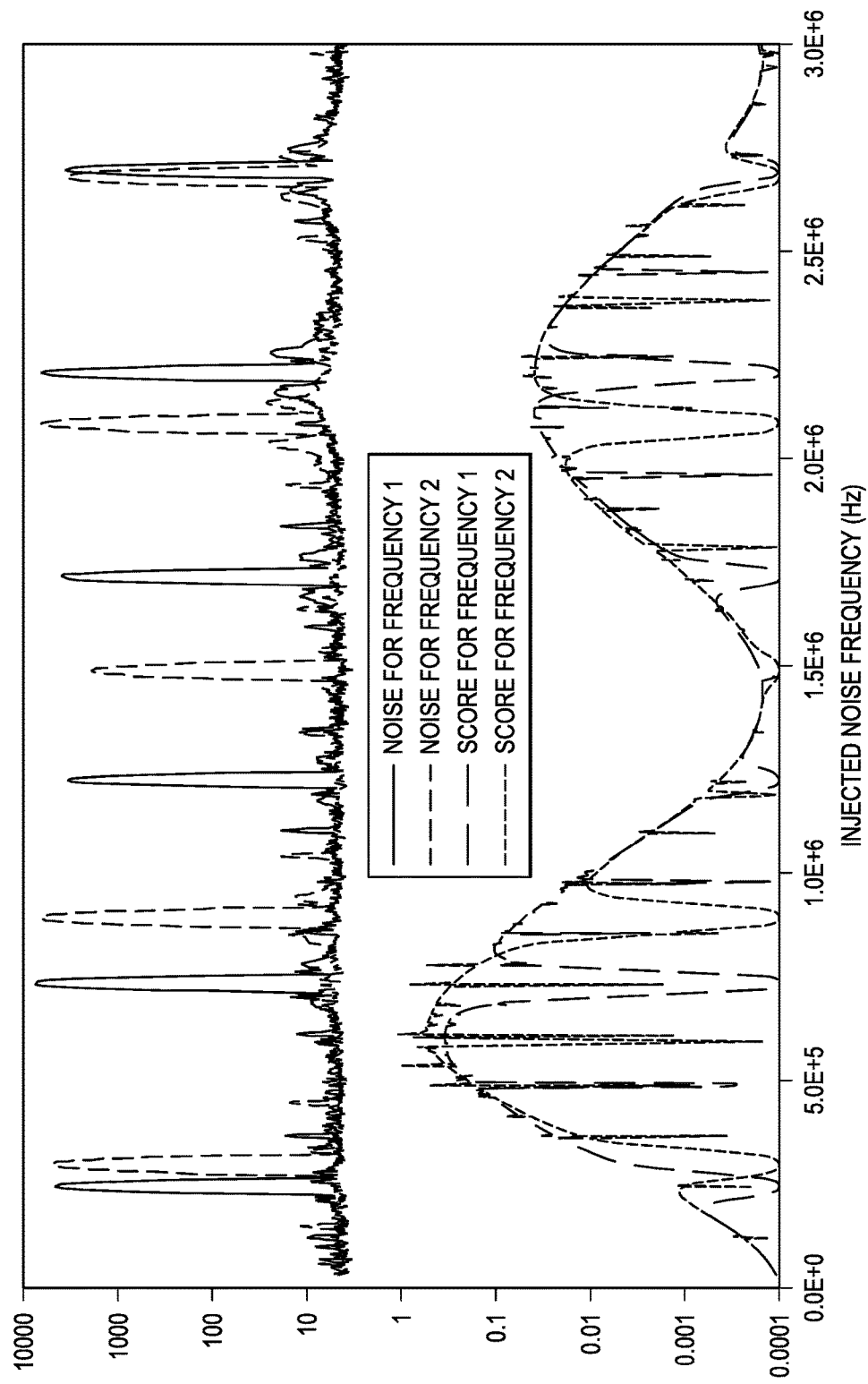
FIG. 12 shows sensor signals and noise acquired with four different sampling rates and associated score values.

FIG. 12 is a continuation from FIG. 6*a*. Two more traces are plotted in the bottom part of the chart, labelled "score for frequency x". The vertical axis is the score, wherein the absolute magnitude is not relevant, only the relative amplitude of one score with respect to the other score matters. The horizontal axis remains the frequency of the injected noise.

One can notice that for noise frequency of about 2.5 MHz (2.5 E+6) there is a particular situation where neither the first nor the second sampling rate are suitable. This case is solved by adding more possible sampling rates, as for example shown in FIG. 13.

Figure 13:
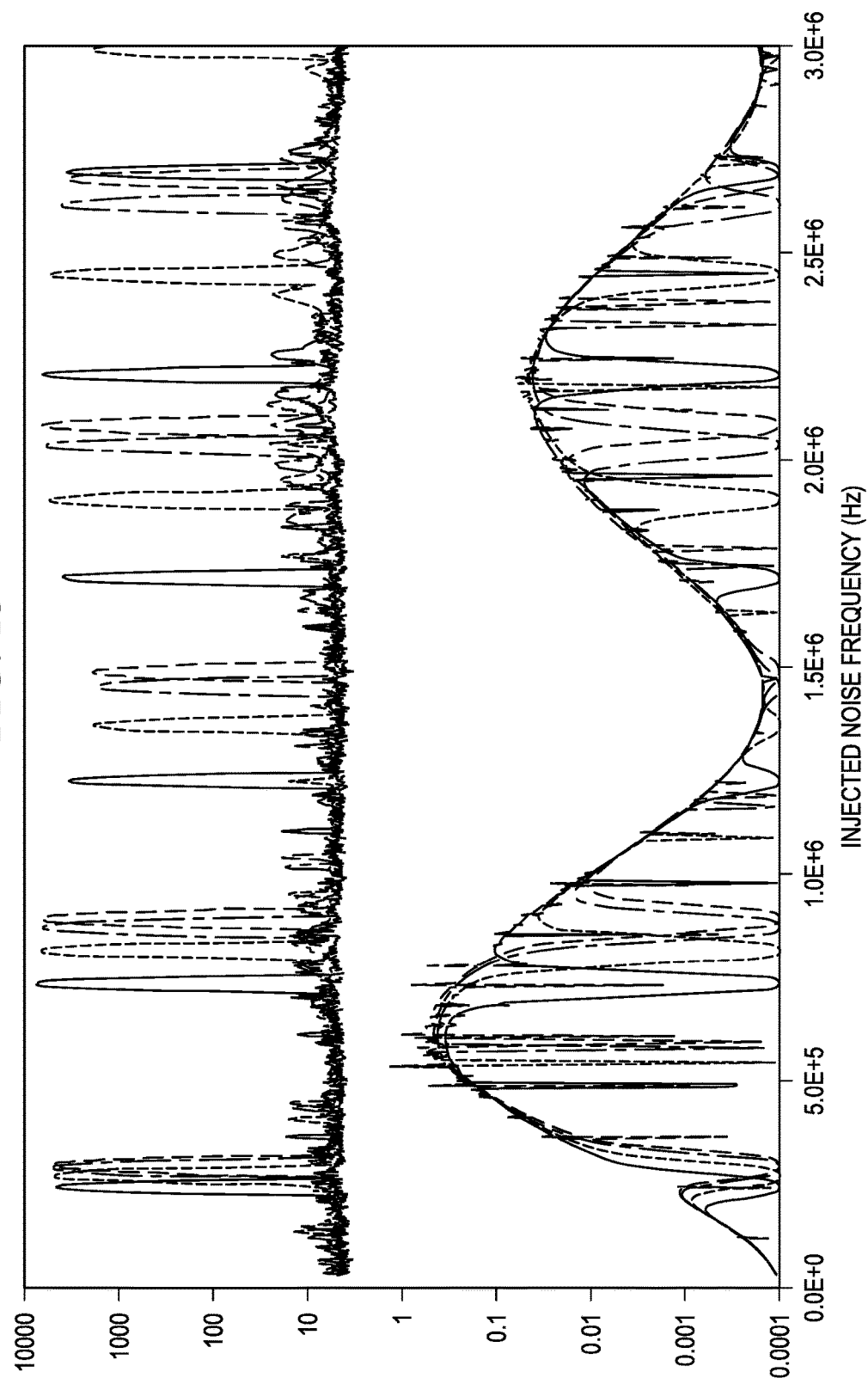
FIG. 13 shows the result of an automatic sampling rate selection according to various embodiments.

FIG. 13 is a continuation from FIG. 12, where two additional sampling frequencies are added, for a total of 4 sampling frequencies. This is only to show that numerous sampling frequencies are sometimes needed to avoid any overlap, as it happened near 2.5 MHz in FIG. 12.

Figure 14:
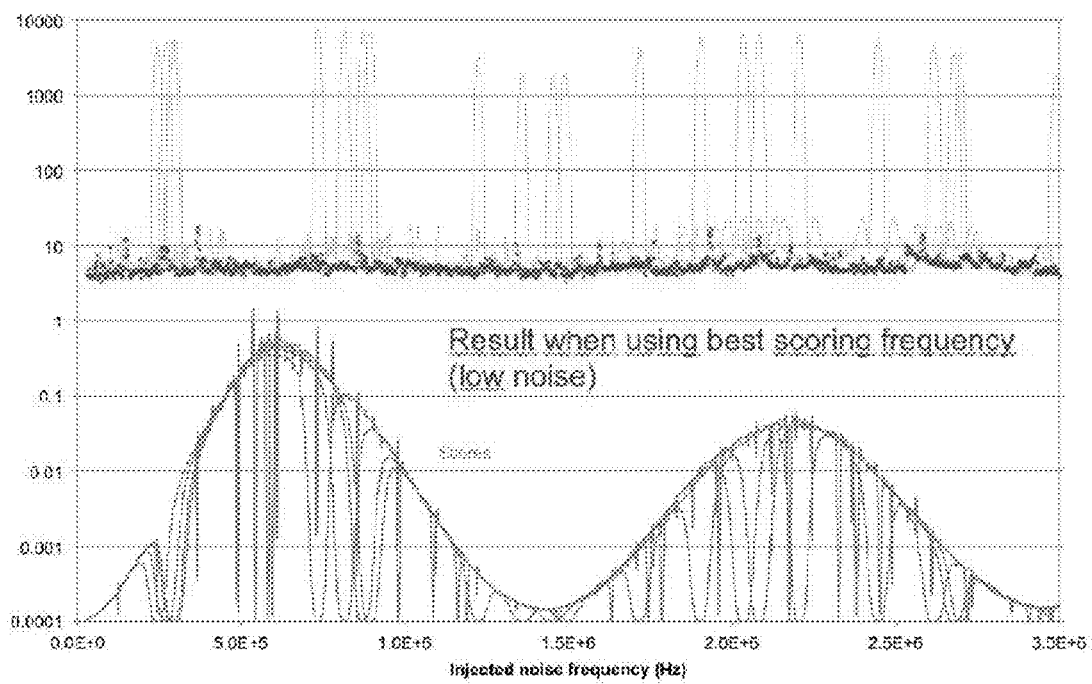
FIG. 14 shows a way to find the best sampling frequency fast.

FIG. 14 is a continuation from FIG. 13. The dots in the upper half of FIG. 14 always overlap one of the 4 noise level curves; the selected noise curve is determined by the highest score value for this given injected noise frequency. This figure illustrates the process of selecting the highest score and shows how the system manages to choose a sampling rate which ensures a low noise.

It is non intuitive that a sampling rate showing more noise within a packet actually yields a lower packet to packet noise. The proposed embodiments are also possible if only individual ADC samples within a packet are accessible for processing.

What is claimed is:

1. A sensor system comprising:
    an acquisition unit comprising an analog to digital converter generating a series of digital sensor signals;
    a first evaluation unit receiving the series of digital sensor signals for evaluation, wherein the first evaluation unit generates output signals that correspond to a sensor event;
    a second evaluation unit independent from said first evaluation unit receiving the series of digital sensor signals;
    wherein at least a first and second series of digital sensor signals is processed by the second evaluation unit to generate a control signal that is configured to select a sampling frequency controlling the analog-to-digital converter,
    wherein the first and second series of digital sensor signals are sampled at different sampling frequencies while converting an analog signal by the analog to digital converter,
    wherein the second evaluation unit further provides for a power estimation of a signal processed by the second evaluation unit.

2. The sensor system according to claim 1, wherein the second evaluation unit comprises a digital filter having an input receiving the series of digital sensor signals and an output providing a signal to generate the control signal.

3. The sensor system according to claim 2, further comprising a switchable filter bank receiving the series of digital sensor signals and a subtraction unit receiving the series of digital sensor signals and being configured to subtract an output signal from the switchable filter bank from the series of digital sensor signals and forward a result to the digital filter.

4. The sensor system according to claim 3, wherein the switchable filter bank is controlled by a counter configured to count a number of sample values within a series of digital sensor signals.

5. The sensor system according to claim 2, further comprising a control unit within the acquisition unit configured to perform subsequent differential sensor signal measurements and a demodulator receiving output signals from the ADC.

6. The sensor system according to claim 5, wherein the demodulator multiplies an output value of the ADC with either "+1" or "−1".

7. The sensor system according to claim 6, wherein the second evaluation unit receives an output value from the demultiplexer and the digital filter is configured to a DC component.

8. The sensor system according to claim 5, wherein a filter characteristic of the digital filter is selected depending on whether the second evaluation unit receives an output value from the ADC directly or an output from the demodulator.

9. The sensor system according to claim 6, wherein the second evaluation unit receives an output value directly from the ADC and the digital filter is configured to reject a modulation frequency of the differential sensor signal measurements.

10. The sensor system according to claim 1, further comprising a first and second register configured to store a first and second score value generated by the power estimator unit and a comparator unit comparing the first and second score value to generate the control signal.

11. The sensor system according to claim 10, wherein if the first score value is greater than or equal to the second score value the control signal is a first logic state and otherwise a second logic state.

12. The sensor system according to claim 10, comprising
a first multiplexer receiving a logic 0, a logic 1 and an output signal from the comparator unit;
a source control unit controlling the multiplexer, wherein an output of the first multiplexer controls a selection of the sampling frequency.

13. The sensor system according to claim 12, wherein the output of the first multiplexer controls a second multiplexer configured to select either the first or second register.

14. The sensor system according to claim 1, wherein the system selects between a plurality of sampling frequencies.

15. The sensor system according to claim 1, wherein the system selects between a first and a second sampling frequency.

16. A sensor system comprising:
an acquisition unit comprising an analog to digital converter generating a series of digital sensor signals;
a first evaluation unit receiving the series of digital sensor signals for evaluation, wherein the first evaluation unit generates output signals that correspond to a sensor event;
a second evaluation unit independent from said first evaluation unit receiving the series of digital sensor signals; wherein at least a first and second series of digital sensor signals is processed by the second evaluation unit to generate a control signal that is configured to select a sampling frequency controlling the analog-to-digital converter, wherein the first and second series of digital sensor signals are sampled at different sampling frequencies while converting an analog signal by the analog to digital converter;
wherein:
the first evaluation unit combines pluralities of subsequent digital sensor signals into single output signals;
the second evaluation unit is configured to evaluate a first packet of digital sensor signals and a second packet of digital sensor signals which immediately follows the first packet; and
each packet comprises digital sensor signals sampled with a different sampling frequency.

17. The sensor system according to claim 16, wherein the second evaluation unit is configured to perform an evaluation periodically after a plurality of packets have been generated.

18. The sensor system according to claim 16, comprising a plurality of sensors, wherein the acquisition system is configured to sequentially acquire at least one packet of sensor signals from each of the plurality of sensors, wherein each packet comprises a plurality of subsequent measurements from a sensor using a selected sampling frequency.

19. The sensor system according to claim 18, wherein the second evaluation unit is configured to select one of the plurality of sensors to provide said first and second packet of digital sensor signals.

20. The sensor system according to claim 19, wherein a sensor of the plurality of sensors providing the strongest signal is selected more often to provide said first and second packet of digital sensor signals.

21. The sensor system according to claim 19, wherein a plurality of sampling frequencies are provide and wherein two preferred sampling frequencies are selected during a plurality of evaluations performed by the second evaluating unit.

22. A method for sampling sensor signals comprising:
generating a series of digital sensor signals with an analog to digital converter;
generating output signals by a first evaluation unit receiving the series of digital sensor signals that correspond to a sensor event;
receiving the series of digital sensor signals by a second evaluation unit independent from said first evaluation unit;
processing at least a first and second series of digital sensor signals by the second evaluation unit to generate a control signal;
selecting by the control signal a sampling frequency controlling the analog-to-digital converter, wherein the first and second series of digital sensor signals are sampled at different sampling frequencies while converting an analog signal by the analog to digital converter; and
performing a power estimation of a signal processed by the second evaluation unit.

23. The method according to claim 22, further comprising filtering the series of digital sensor signals and generating the control signal by the second evaluation unit.

24. The method according to claim 23, further comprising: combining pluralities of subsequent digital sensor signals into single output signals, and evaluating a first packet of digital sensor signals and a second packet of digital sensor signals which immediately follows the first packet, wherein each packet comprises digital sensor signals sampled with a different sampling frequency.

25. The method according to claim 24, further comprising: performing an evaluation periodically after a plurality of packets have been generated.

26. The method according to claim 22, further comprising storing a first and second score value generated by the power estimation and comparing the first and second score value to generate the control signal.

27. The method according to claim 22, wherein if the first score value is greater than or equal to the second score value the control signal is a first logic state and otherwise a second logic state.

28. The method according to claim 22, further comprising: selecting between a plurality of sampling frequencies.

29. The method according to claim 22, further comprising selecting between a first and a second sampling frequency.

30. A method for sampling sensor signals comprising:
generating a series of digital sensor signals with an analog to digital converter;
generating output signals by a first evaluation unit receiving the series of digital sensor signals that correspond to a sensor event;
receiving the series of digital sensor signals by a second evaluation unit independent from said first evaluation unit;
processing at least a first and second series of digital sensor signals by the second evaluation unit to generate a control signal;
selecting by the control signal a sampling frequency controlling the analog-to-digital converter, wherein the first and second series of digital sensor signals are sampled at different sampling frequencies while converting an analog signal by the analog to digital converter; and
subtracting an output signal from a switchable filter bank receiving the series of digital sensor signals from the series of digital sensor signals and forward a result for further filtering.

31. The method according to claim 30, further comprising: controlling the switchable filter bank by a counter configured to count a number of sample values within a series of digital sensor signals.

32. A method for sampling sensor signals comprising:
generating a series of digital sensor signals with an analog to digital converter;
generating output signals by a first evaluation unit receiving the series of digital sensor signals that correspond to a sensor event;
receiving the series of digital sensor signals by a second evaluation unit independent from said first evaluation unit;
processing at least a first and second series of digital sensor signals by the second evaluation unit to generate a control signal;
selecting by the control signal a sampling frequency controlling the analog-to-digital converter, wherein the first and second series of digital sensor signals are sampled at different sampling frequencies while converting an analog signal by the analog to digital converter;
providing a plurality of sensors; and
sequentially acquiring at least one packet of sensor signals from each of the plurality of sensors, wherein each packet comprises a plurality of subsequent measurements from a sensor using a selected sampling frequency.

33. The method according to claim 32, further comprising: selecting one of the plurality of sensors to provide said first and second packet of digital sensor signals.

34. The method according to claim 33, wherein a sensor from the plurality of sensors providing the strongest signal is selected more often to provide said first and second packet of digital sensor signals.

35. The method according to claim 33, wherein a plurality of sampling frequencies are provide and wherein two preferred sampling frequencies are selected during a plurality of evaluations performed by the second evaluating unit.

* * * * *